(12) United States Patent
Hsu et al.

(10) Patent No.: US 10,761,574 B1
(45) Date of Patent: Sep. 1, 2020

(54) HINGE MECHANISM AND FLEXIBLE ELECTRONIC DEVICE HAVING THE SAME

(71) Applicant: FOSITEK CORPORATION, New Taipei (TW)

(72) Inventors: An-Szu Hsu, New Taipei (TW); Way-Han Dai, New Taipei (TW); Shao-Chun Chao, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 16/669,976

(22) Filed: Oct. 31, 2019

(30) Foreign Application Priority Data

Jul. 9, 2019 (TW) .............................. 108124126 A

(51) Int. Cl.
| G06F 1/16 | (2006.01) |
| E05D 11/08 | (2006.01) |
| E05D 7/00 | (2006.01) |
| E05D 3/12 | (2006.01) |

(52) U.S. Cl.
CPC .......... *G06F 1/1681* (2013.01); *E05D 3/122* (2013.01); *E05D 7/00* (2013.01); *E05D 11/087* (2013.01); *G06F 1/1626* (2013.01); *G06F 1/1652* (2013.01); *E05Y 2900/606* (2013.01)

(58) Field of Classification Search
CPC ..... G06F 1/1616; G06F 1/1681; G06F 1/1652

USPC ....................................... 361/679.21, 679.27
See application file for complete search history.

(56) References Cited

U.S. PATENT DOCUMENTS

| 9,600,035 | B2 * | 3/2017 | Park ...................... G06F 1/1652 |
| 10,423,019 | B1 * | 9/2019 | Song ...................... G06F 1/1681 |
| 10,564,682 | B1 * | 2/2020 | Wu ......................... G06F 1/1681 |
| 2013/0021762 | A1 * | 1/2013 | van Dijk ............... H05K 5/0226 361/749 |
| 2015/0241925 | A1 * | 8/2015 | Seo ....................... G06F 1/1681 361/679.27 |

* cited by examiner

*Primary Examiner* — Anthony Q Edwards
(74) *Attorney, Agent, or Firm* — Birch, Stewart, Kolasch & Birch, LLP

(57) ABSTRACT

A flexible electronic device includes a flexible display, a support mechanism for carrying the flexible display thereon, and two hinge mechanisms. Each of the hinge mechanisms is disposed between first and second substrate units and interconnects inboard end edges of the first and second substrate units of the support mechanism, and includes first and second linking units pivotable relative to a mounting assembly. With a first height between first outer and inner pivot axes of the first linking unit and a second height between second outer and inner pivot axes of the second linking unit, substrate seats can be moved away from inner support plates, and the inner support plates are movable downwardly to provide a leeway space for a bending part of the flexible display to be bendably received therein.

9 Claims, 22 Drawing Sheets

HINGE MECHANISM AND FLEXIBLE ELECTRONIC DEVICE HAVING THE SAME

CROSS-REFERENCE TO RELATED APPLICATION

This application claims priority of Taiwanese Patent Application No. 108124126, filed on Jul. 9, 2019.

FIELD

The disclosure relates to a hinge mechanism, and more particularly to a hinge mechanism for a flexible electronic device and a flexible electronic device having such mechanism.

BACKGROUND

A conventional consumer electronic device with flexible display technology generally has two substrates for mounting a flexible display thereon, and at least one hinge mechanism disposed between the substrates to permit shifting of the substrates between a parallel unfolded state and an upright folded state so as to fold and unfold the flexible display. When the flexible display is folded, an additional receiving space within the hinge mechanism is required for receiving a bending portion of the flexible display to prevent damage to the flexible display.

SUMMARY

Therefore, an object of the disclosure is to provide a hinge mechanism and a flexible electronic device that can alleviate at least one of the drawbacks of the prior art.

According to the disclosure, the hinge mechanism is mountable on a support mechanism for carrying a flexible display. The support mechanism includes a base seat, and first and second substrate units which are respectively disposed at two sides of the base seat opposite in a left-right direction. The hinge mechanism includes a mounting assembly, a first linking unit and a second linking unit. The mounting assembly is securely mountable on the base seat, and has first and second pivoted portions opposite to each other in the left-right direction and respectively adjacent to the first and second substrate units. The first linking unit is disposed at and pivotable relative to the first pivoted portion, and includes a first inner pivot arm, a first outer pivot arm and a first slide piece. The first inner pivot arm has a first inner pivot end which is pivotably connected to the first pivoted portion about a first inner pivot axis, and a first inner connecting end which is opposite to the first inner pivot end to be turned about the first inner pivot axis during pivoting of the first linking unit. The first outer pivot arm has a first outer slided body which extends in the left-right direction to terminate at a first outer pivot end that is disposed outboard of the first inner pivot end. The first outer pivot end is pivotably connected to the first pivoted portion about a first outer pivot axis which is offset from the first inner pivot axis in an up-down direction with a first height such that the first outer slided body is turned about the first outer pivot axis during the pivoting of the first linking unit. The first slide piece is connected with the first substrate unit, and has a first slide body which extends in the left-right direction to have a proximate slide end that is proximate to the mounting assembly and that is slidable on the first outer slided body, and a distal connecting end that is distal from the mounting assembly and that is connected with the first inner connecting end. The second linking unit is disposed at and pivotable relative to the second pivoted portion, and includes a second inner pivot arm, a second outer pivot arm and a second slide piece. The second inner pivot arm has a second inner pivot end which is pivotably connected to the second pivoted portion about a second inner pivot axis, and a second inner connecting end which is opposite to the second inner pivot end to be turned about the second inner pivot axis during pivoting of the second linking unit. The second outer pivot arm has a second outer slided body which extends in the left-right direction to terminate at a second outer pivot end that is disposed outboard of the second inner pivot end. The second outer pivot end is pivotably connected to the second pivoted portion about a second outer pivot axis which is offset from the second inner pivot axis in the up-down direction with a second height such that the second outer slided body is turned about the second outer pivot axis during the pivoting of the second linking unit. The second slide piece is connected with the second substrate unit, and has a second slide body which extends in the left-right direction to have a proximate slide end that is proximate to the mounting assembly and that is slidable on the second outer slided body, and a distal connecting end that is distal from the mounting assembly and that is connected with the second inner connecting end. During the pivoting of the first linking unit, turning of the first inner connecting end brings the distal connecting end of the first slide body into an outward movement away from the first outer slided body. During the pivoting of the second linking unit, turning of the second inner connecting end brings the distal connecting end of the second slide body into an outward movement away from the second outer slided body so as to place the first substrate unit and the second substrate unit from a parallel unfolded state to an upright folded state, and form a leeway space between the first and second substrate units.

According to the disclosure, the flexible electronic device includes a flexible display, a support mechanism for carrying the flexible display thereon, and including a base seat, and first and second substrate units which are respectively disposed at two sides of the base seat opposite in a left-right direction, and two hinge mechanisms as described previously. Each of the hinge mechanisms is disposed between the first and second substrate units and interconnects inboard end edges of the first and second substrate units.

BRIEF DESCRIPTION OF THE DRAWINGS

Other features and advantages of the disclosure will become apparent in the following detailed description of the embodiment with reference to the accompanying drawings, of which.

DETAILED DESCRIPTION

To aid in describing the disclosure, directional terms may be used in the specification and claims to describe portions of the present disclosure (e.g., front, rear, left, right, up, down, etc.). These directional definitions are intended to merely assist in describing and claiming the disclosure and are not intended to limit the disclosure in any way.

Figure 1:
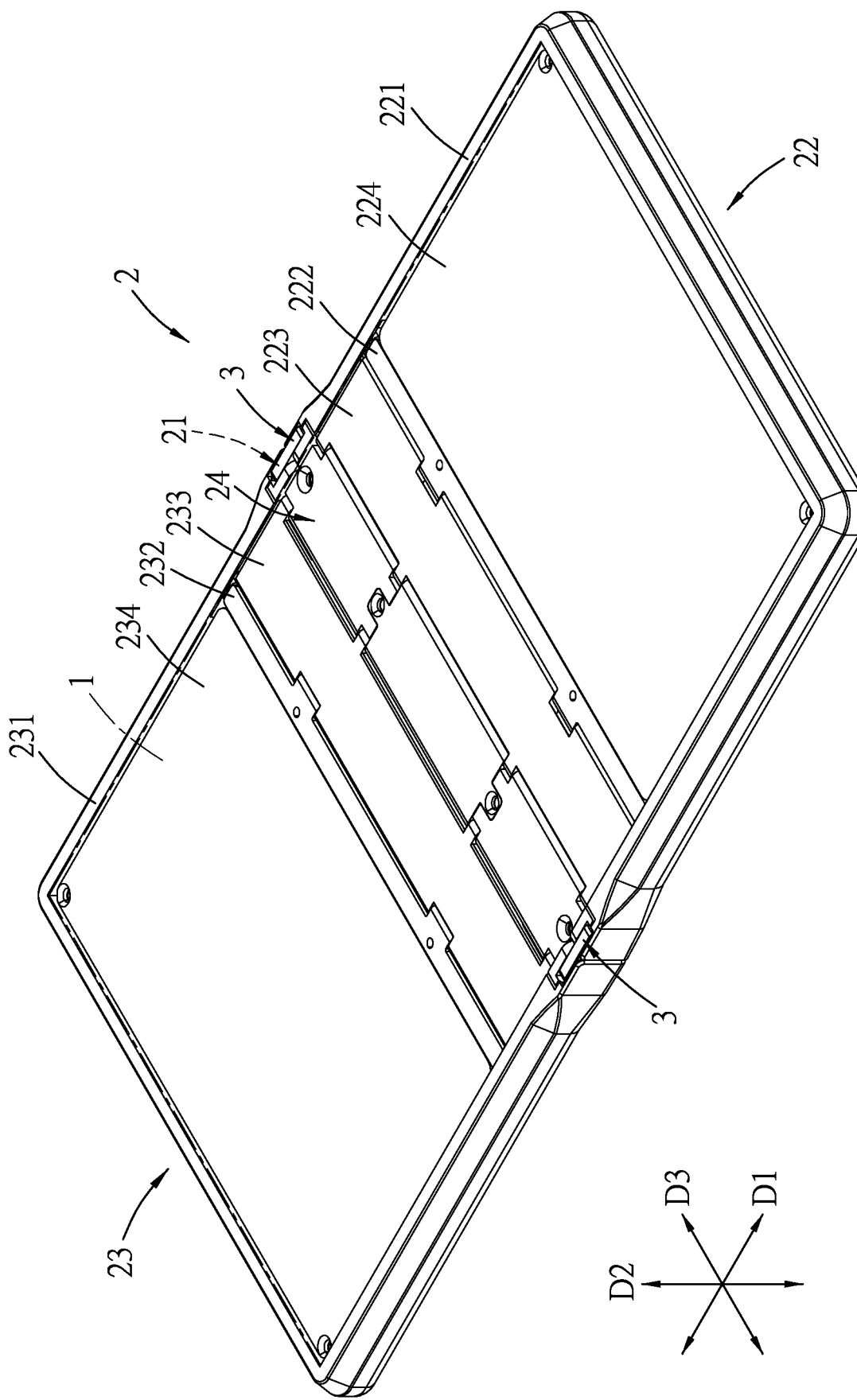
FIG. 1 is a perspective view illustrating an embodiment of a flexible electronic device according to the disclosure in an unfolded state.
Figure 2:
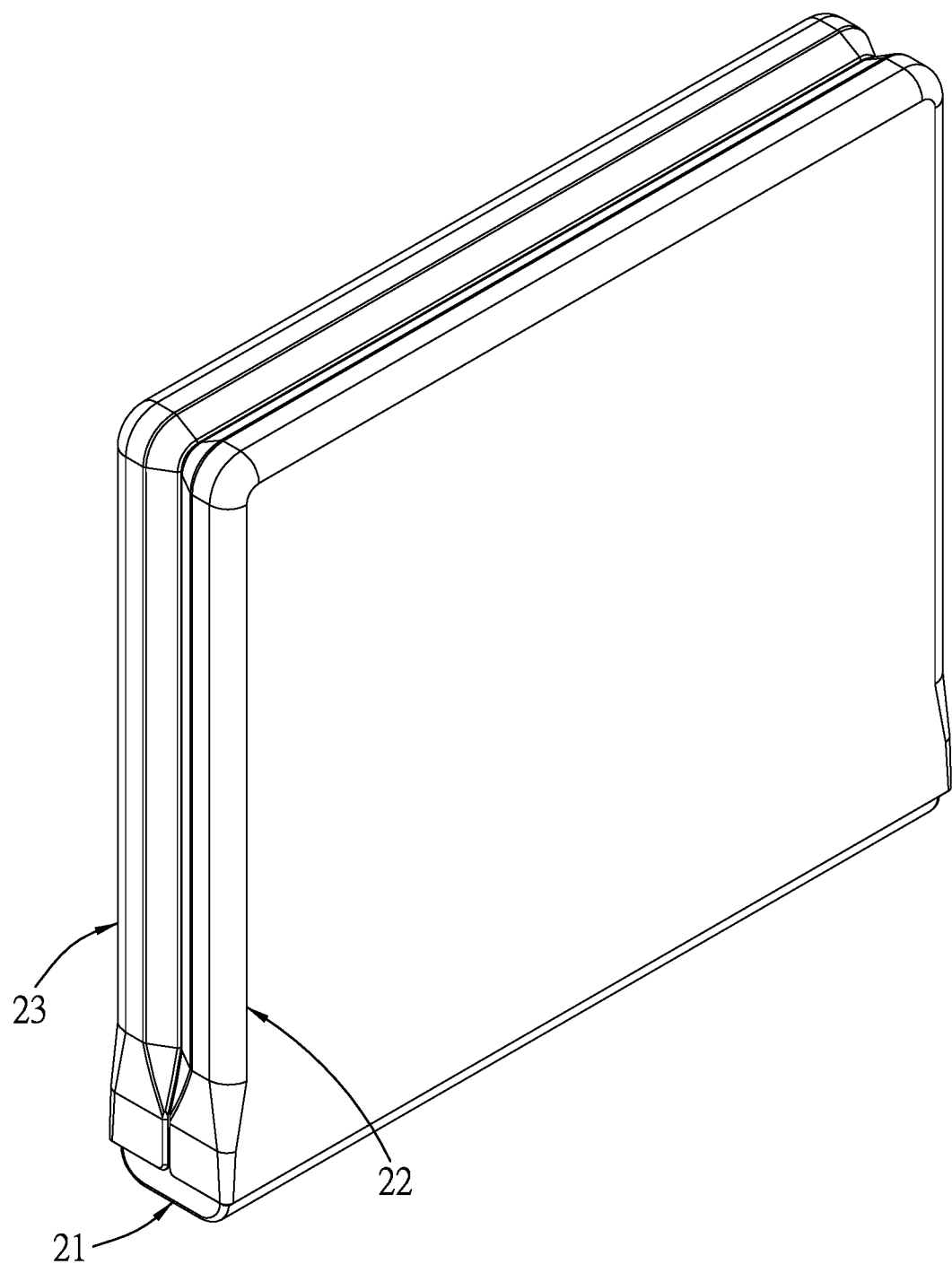
FIG. 2 is a perspective view of the embodiment in a folded state.
Figure 3:
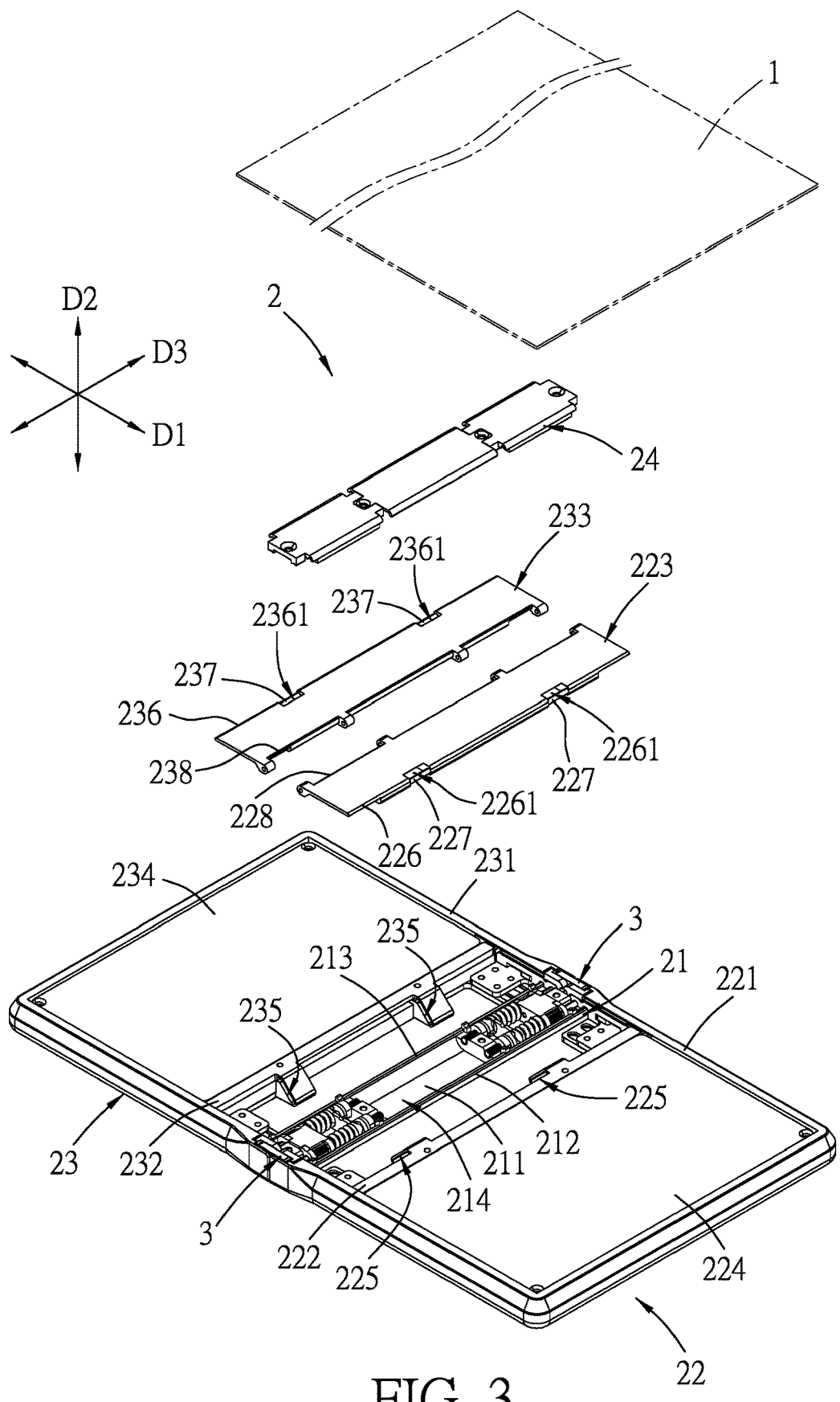
FIG. 3 is a partially exploded perspective view of the embodiment.

Referring to FIGS. 1 to 3, an embodiment of a flexible electronic device according to the disclosure includes a flexible display 1, a support mechanism 2 and two hinge mechanisms 3. In this embodiment, the flexible electronic device is a tablet PC having the flexible display 1 attached to an upper supporting surface of the support mechanism 2. The hinge mechanisms 3 are disposed to permit the flexible electronic device to be operable between an unfolded state (as shown in FIG. 1) and a folded state (as shown in FIG. 2) and also to angularly position the flexible electronic device at a desired state. In the folded state, the hinge mechanisms 3 can provide a bending space for receiving a bending portion of the flexible display 1 to prevent damage to the flexible display 1. In other embodiments, the flexible electronic device may be a mobile phone, a portable PC, and so forth which have the flexible display 1.

With reference again to FIGS. 1 to 3, the support mechanism 2 includes a base seat 21, first and second substrate units 22, 23 and an upper support plate 24. In this embodiment, the base seat 21 has a lower wall 211 elongated in a front-rear direction (D3), and first and second long walls 212, 213 extending upwardly and respectively from two long sides of the base seat 21 to define an accommodation space 214 thereamong. The first and second substrate units 22, 23 are respectively disposed at two sides of the base seat 21 opposite in a left-right direction (D1). The first substrate unit 22 has a first housing 221, and a first substrate seat 222, a first inner support plate 223 and a first outer support plate 224 which are disposed upon the first housing 221 and coplanar with each other. The second substrate unit 23 has a second housing 231, and a second substrate seat 232, a second inner support plate 233 and a second outer support plate 234 which are disposed upon the second housing 231 and coplanar with each other.

In this embodiment, in the parallel unfolded state, two adjacent side edges of the first and second housings 221, 231 abut against each other to conceal the base seat 21. In the folded state, the first and second housings 221, 231 are close to each other to expose the base seat 21, as shown in FIG. 2. The base seat 21 is disposed to protect and conceal the hinge mechanisms 3.

Figure 4:
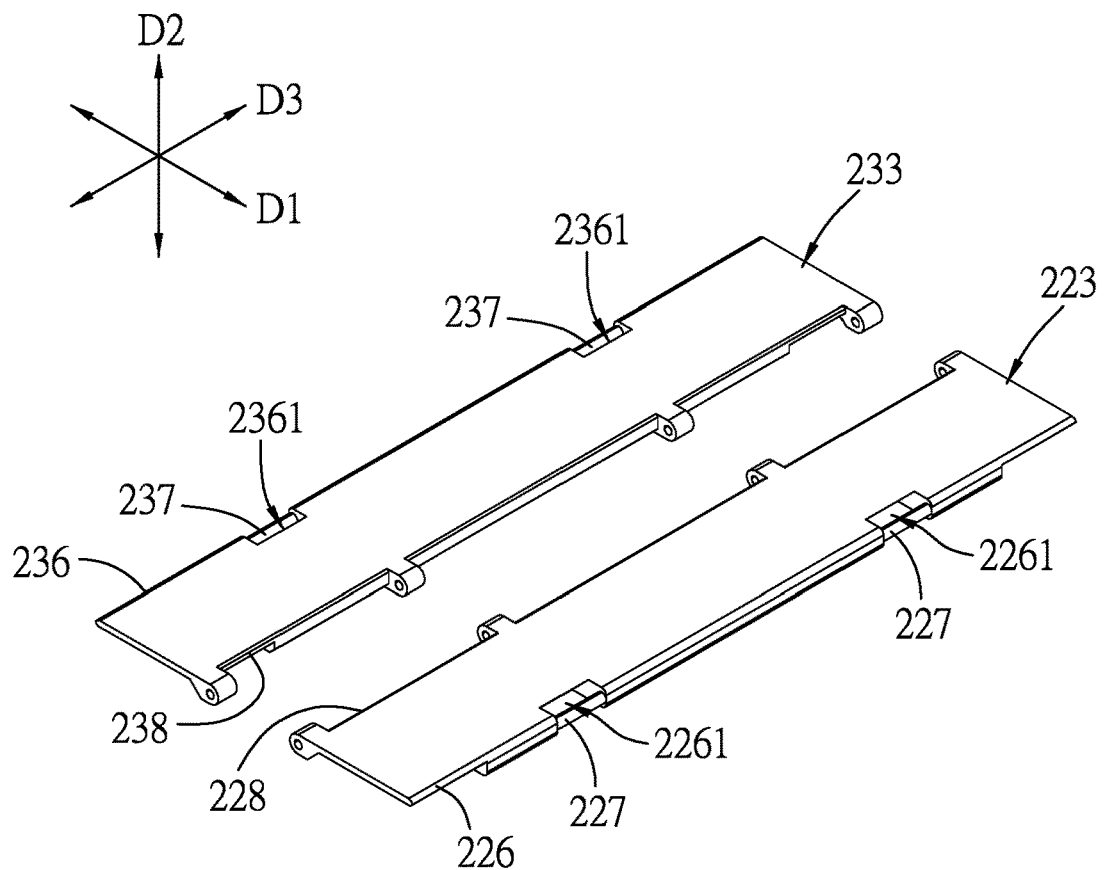
FIGS. 4 and 5 are partially exploded perspective view illustrating a first substrate seat, a second substrate seat, a first inner support plate and a second inner support plate of the embodiment.
Figure 4:
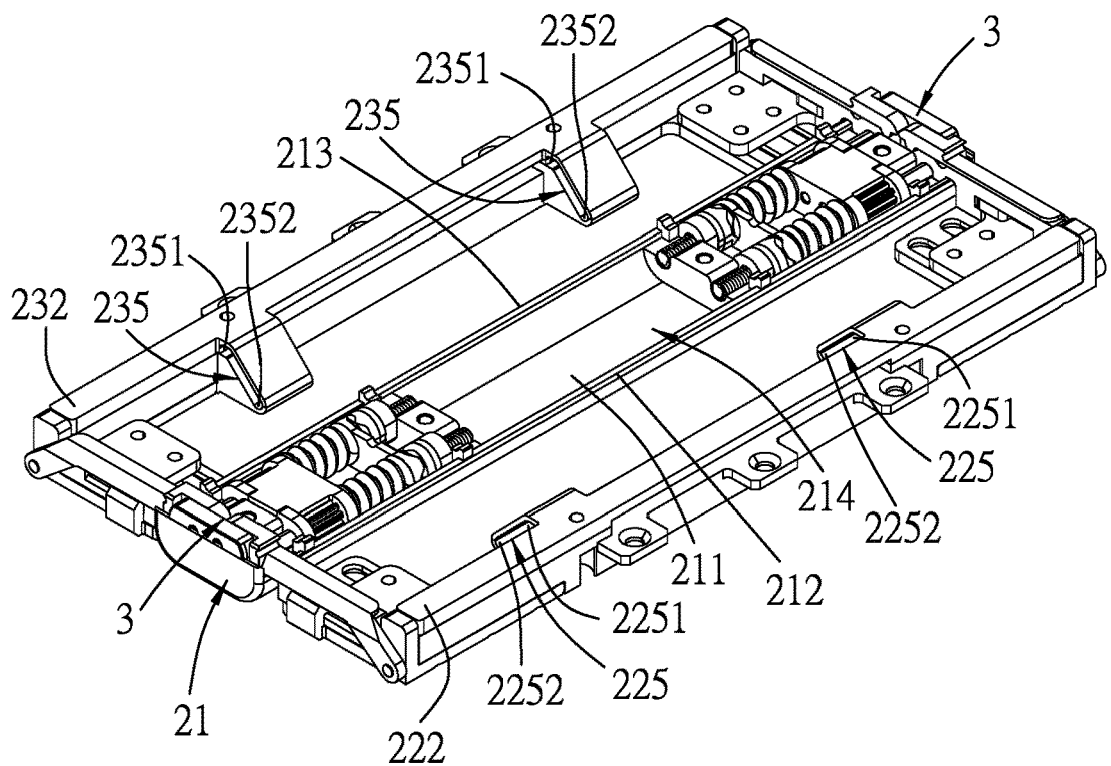
Figure 5:
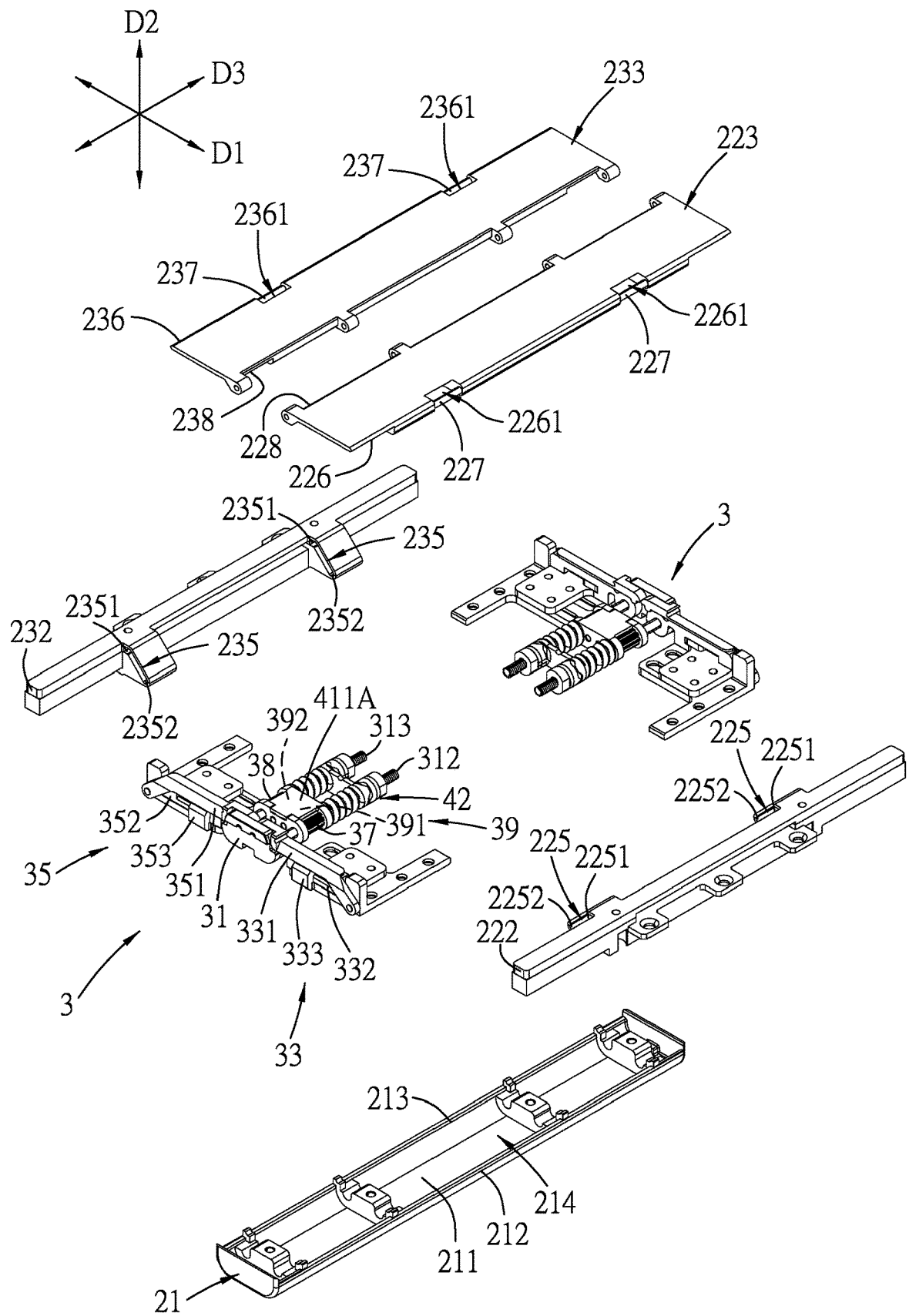

Referring to FIGS. 3 to 5, in this embodiment, the first substrate seat 222 extends in the front-rear direction (D3), and is spaced apart from the first long wall 212 of the base seat 21. The first substrate seat 222 has a plurality of first connecting slots 225 which are formed in a proximal side relative to the base seat 21 and spaced apart from each other in the front-rear direction (D3). Specifically, the first substrate seat 222 has two first connecting slots 225 each extending from an upper end of the first substrate seat 222 toward a lower wall of the first housing 221 and inclined toward the base seat 21. Each first connecting slot 225 has an upper unfolded end 2251 and a lower folded end 2252 respectively adjacent to the upper end of the first substrate seat 222 and the lower wall of the first housing 221. The number of the first connecting slots 225 may be varied, such as one or more than three. Similar to the first substrate seat 222, the second substrate seat 232 extends in the front-rear direction (D3), and is spaced apart from the second long wall 213 of the base seat 21. The second substrate seat 232 has a plurality of second connecting slots 235 which are formed in a proximal side relative to the base seat 21 and spaced apart from each other in the front-rear direction (D3). Specifically, the second substrate seat 232 has two second connecting slots 235 each extending from an upper end of the second substrate seat 232 toward a lower wall of the second housing 231 and inclined toward the base seat 21. Each second connecting slot 235 has an upper unfolded end 2351 and a lower folded end 2352 respectively adjacent to the upper end of the second substrate seat 232 and the lower wall of the second housing 231. Alternatively, the number of the second connecting slots 235 may be one or more than three.

Referring again to FIGS. 3 to 5, the first inner support plate 223 is interposed between the base seat 21 and the first substrate seat 222, and has at least one notch 2261 formed in an adjoined side 226 relative to the first substrate seat 222, and at least one connecting pin 227 formed in the notch 2261 and slidably engaged in the first connecting slot 225. In this embodiment, the first inner support plate 223 has two notches 2261 respectively aligned with the first connecting slots 225, and two connecting pins 227 respectively secured in the notches 2261 and extending in the front-rear direction (D3). The second inner support plate 233 is interposed between the base seat 21 and the second substrate seat 232, and has at least one notch 2361 formed in an adjoined side 236 relative to the second substrate seat 232, and at least one connecting pin 237 formed in the notch 2361 and slidably engaged in the second connecting slot 235. In this embodiment, the second inner support plate 233 has two notches 2361 respectively aligned with the second connecting slots 235, and two connecting pins 237 respectively secured in the notches 2361 and extending in the front-rear direction (D3).

Referring to FIGS. 1 and 3, in this embodiment, the first and second outer support plates 224, 234 are respectively disposed outboard of the first and second substrate seats 222, 232. The upper support plate 24 is disposed above the base seat 21 and has two opposite long side edges pivotally connected to inboard sides 228, 238 of the first and second inner support plates 223, 233. The first outer support plate 224, the upper end of the first substrate seat 222, the first inner support plate 223, the upper support plate 24, the second inner support plate 233, the upper end of the second substrate seat 232, and the second outer support plate 234 are coplanar and cooperatively define the upper support surface for carrying the flexible display 1 thereon.

Figure 6:
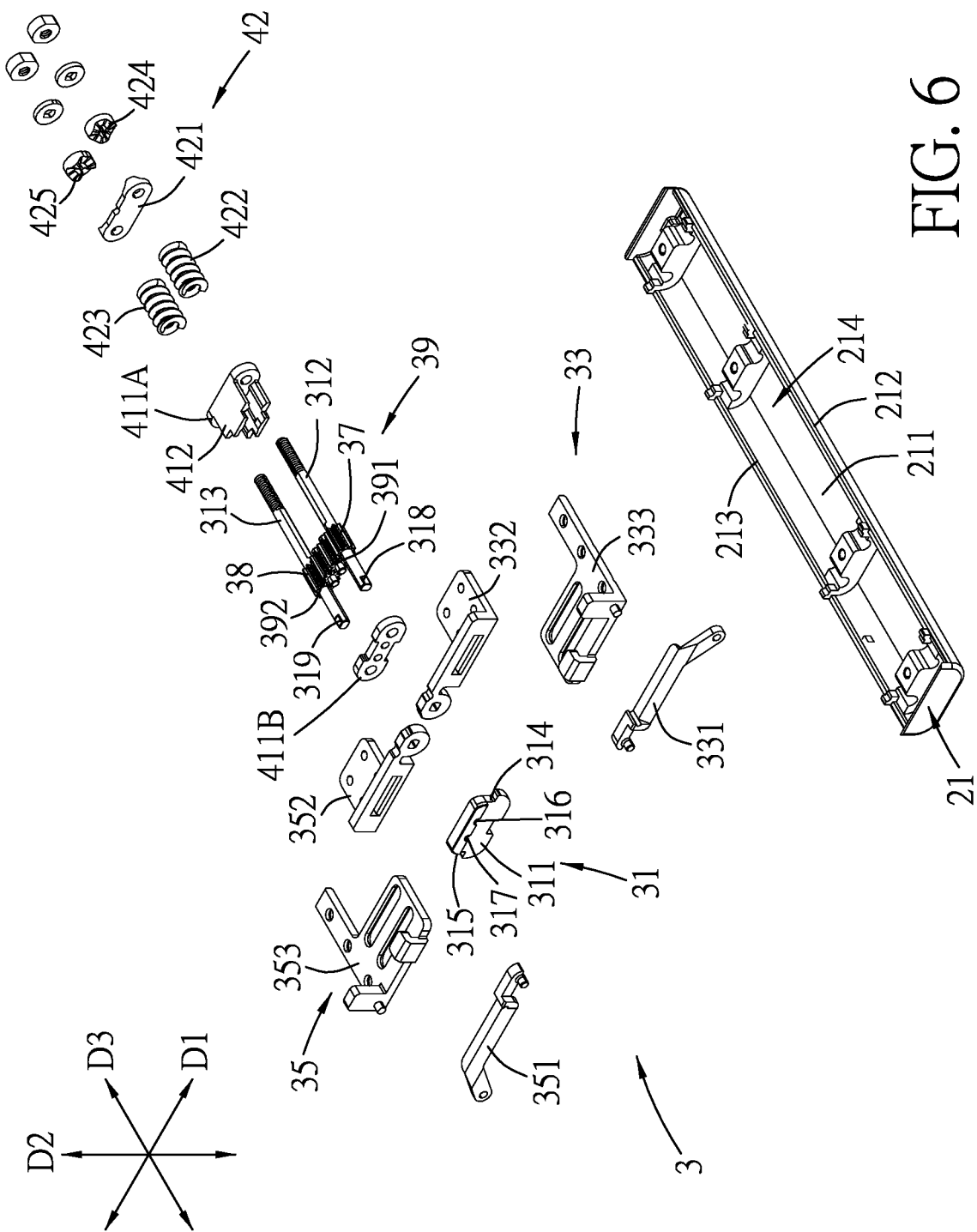
FIG. 6 is an exploded perspective view illustrating a hinge mechanism of the embodiment.

Referring again to FIGS. 1 and 3, the hinge mechanisms 3 are disposed between the first and second substrate units 22, 23 and interconnect the first and second substrate seats 222, 232. In this embodiment, the hinge mechanisms 3 are symmetrically disposed between and interconnect the first and second substrate units 22, 23 in the front-rear direction (D3), as shown in FIG. 4. With reference to FIGS. 5 and 6, each hinge mechanism 3 includes a mounting assembly 31, a first linking unit 33, a second linking unit 35, a first linking member 37, a second linking member 38, a synchronously driving unit 39, two mounting plates 411A, 411B, and a friction increasing unit 42.

Figure 7:
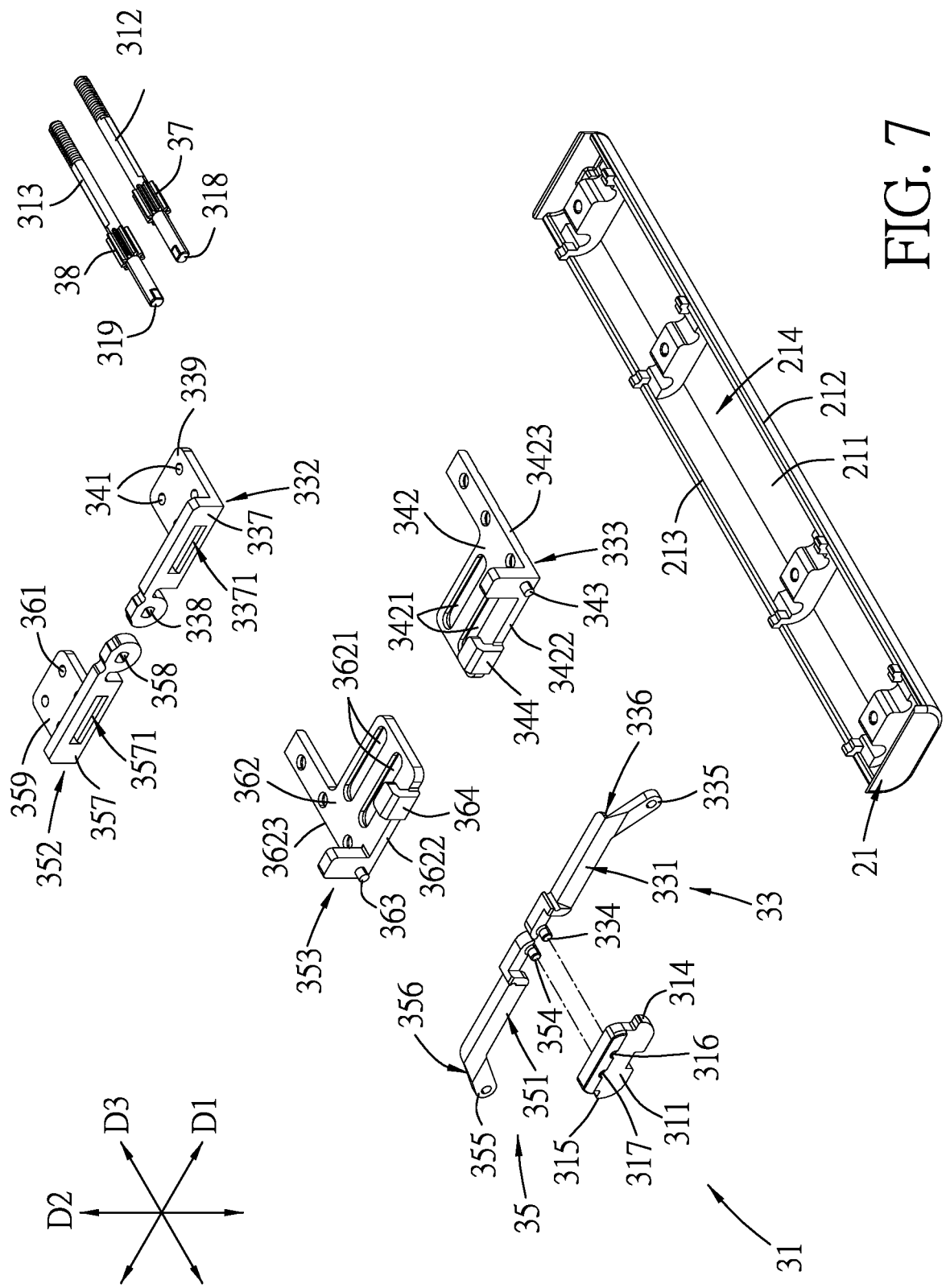
FIG. 7 is an exploded perspective view illustrating a first linking unit and a second linking unit of the hinge mechanism.

Referring to FIGS. 6 and 7, the mounting assembly 31 includes a fixed piece 311, a first axial shaft 312 and a second axial shaft 313. In this embodiment, the fixed piece 311 is securely mounted on an end wall of the base seat 21. The fixed piece 311 has first and second pivoted portions 314, 315 opposite to each other in the left-right direction (D1) and respectively adjacent to the first and second substrate units 22, 23. First and second pivot holes 316, 317 are formed in the first and second pivoted portions 314, 315, respectively, and are spaced apart from each other in the left-right direction (D1) at the same height to define first and second inner pivot axes, respectively. The first and second axial shafts 312, 313 are spaced apart from each other in the left-right direction (D1) and extend in the front-rear direction (D3). The first axial shaft 312 has a front shaft end 318 disposed outwardly and downwardly of the first pivot hole 316 to define a first outer pivot axis. The second axial shaft 313 has a front shaft end 319 disposed outwardly and downwardly of the second pivot hole 317 to define a second outer pivot axis.

Referring again to FIGS. 6 and 7, the first linking unit 33 is disposed at and pivotable relative to the first pivoted portion 314, and includes a first inner pivot arm 331, a first outer pivot arm 332 and a first slide piece 333. The second linking unit 35 is disposed at and pivotable relative to the second pivoted portion 315, and includes a second inner pivot arm 351, a second outer pivot arm 352 and a second slide piece 353.

Referring to FIGS. 5 and 7, the first inner pivot arm 331 has a first inner pivot end 334 which is pivotably connected to the first pivoted portion 314 of the fixed piece 311, and a first inner connecting end 335 which is opposite to the first inner pivot end 334. The second inner pivot arm 351 has a second inner pivot end 354 which is pivotably connected to the second pivoted portion 315 of the fixed piece 311, and a second inner connecting end 355 which is opposite to the second inner pivot end 354. In this embodiment, the first inner pivot end 334 is in the form of a pin which is rotatably engaged in the first pivot hole 316 such that the first inner connecting end 335 is turnable about the first inner pivot axis during pivoting of the first linking unit 33. The first inner pivot arm 331 is formed with a mounting space 336 adjacent to the first inner connecting end 335. The second inner pivot end 354 is in the form of a pin which is rotatably engaged in the second pivot hole 317 such that the second inner connecting end 355 is turnable about the second inner pivot axis during pivoting of the second linking unit 35. The second inner pivot arm 351 is formed with a mounting space 356 adjacent to the second inner connecting end 355.

Figure 8:
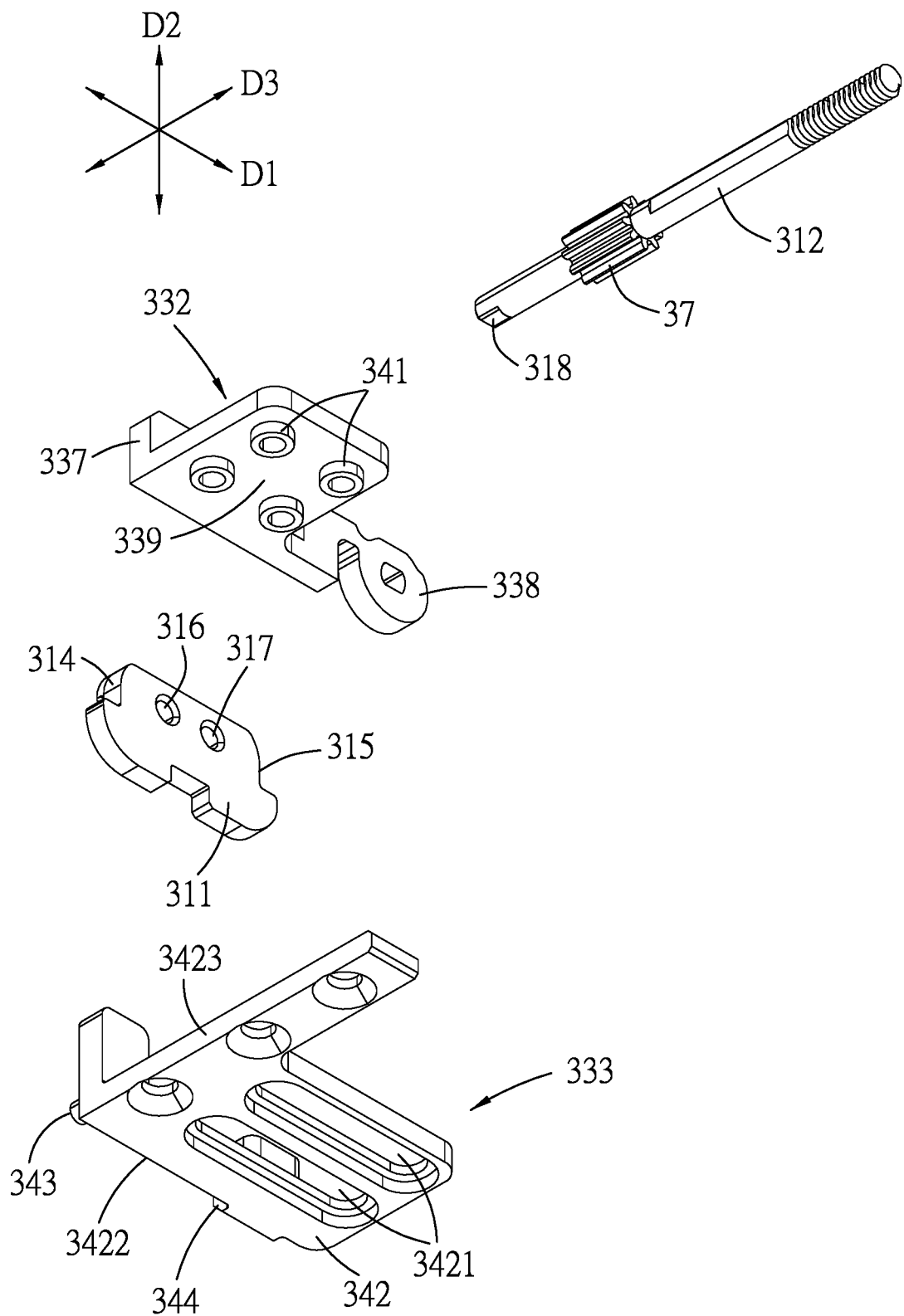
FIG. 8 is an exploded perspective view illustrating a portion of the first linking unit and a mounting assembly of the hinge mechanism.
Figure 9:
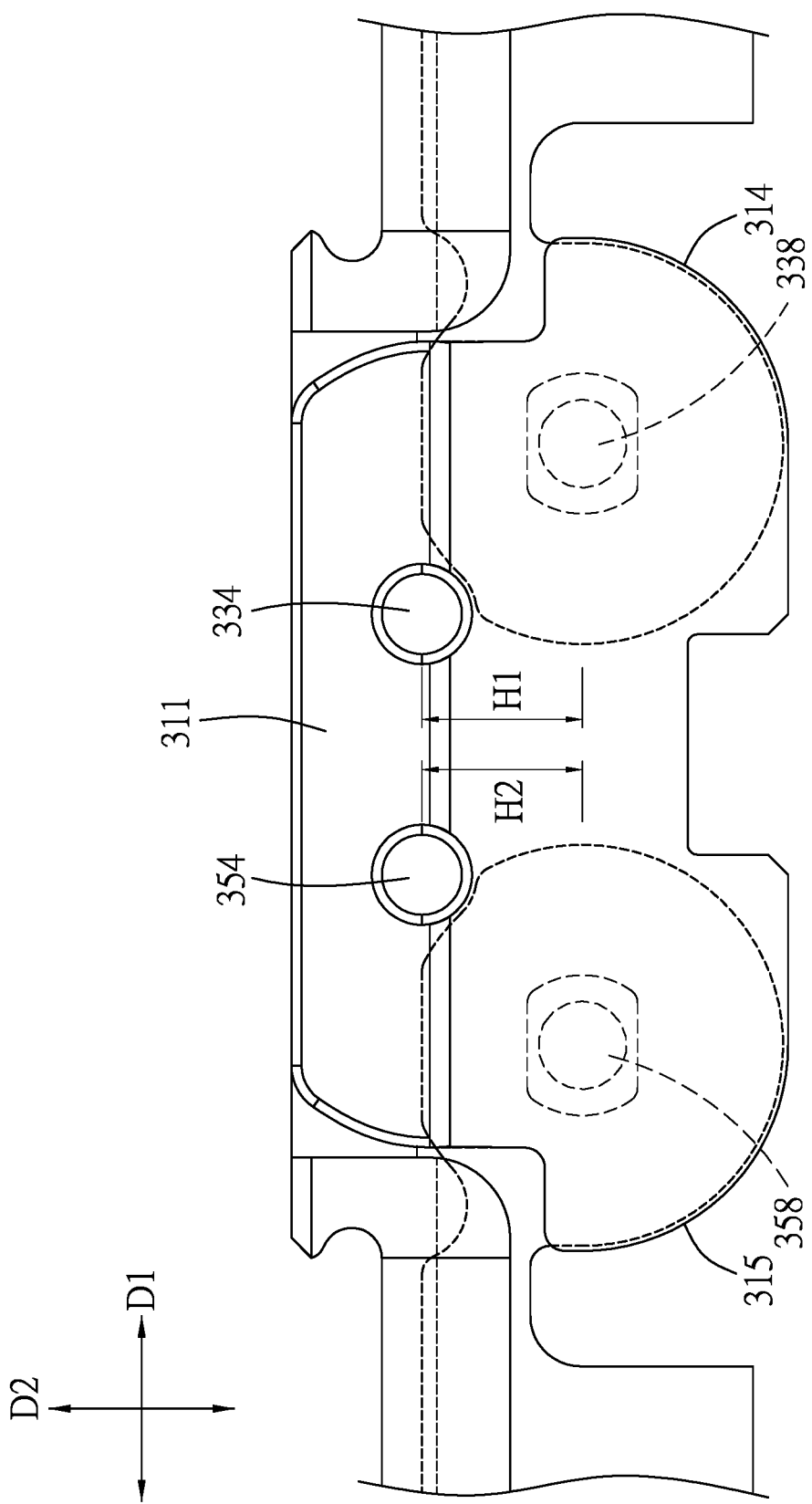
FIG. 9 is a fragmentary, schematic front view of the hinge mechanism.

Referring to FIGS. 7 to 9, the first outer pivot arm 332 has a first outer slided body 337 which extends in the left-right direction (D1) to terminate at a first outer pivot end 338 that is disposed outboard of the first inner pivot end 334. The first outer pivot end 338 is pivotably connected to the first pivoted portion 314 about the first outer pivot axis which is offset from the first inner pivot axis in an up-down direction (D2) with a first height (H1) such that the first outer slided body 337 is turned about the first outer pivot axis during the pivoting of the first linking unit 33. The first outer pivot arm 332 further extends in the front-rear direction (D3) to have a slided wall 339, and has at least one first auxiliary protrusion 341 which projects from the slided wall 339. The second outer pivot arm 352 has a second outer slided body 357 which extends in the left-right direction (D1) to terminate at a second outer pivot end 358 that is disposed outboard of the second inner pivot end 354. The second outer pivot end 358 is pivotably connected to the second pivoted portion 315 about the second outer pivot axis which is offset from the second inner pivot axis in the up-down direction (D2) with a second height (H2) such that the second outer slided body 357 is turned about the second outer pivot axis during the pivoting of the second linking unit 35. The second outer pivot arm 352 further extends in the front-rear direction (D3) to have a slided wall 359, and has at least one second auxiliary protrusion 361 which projects from the slided wall 359.

Referring to FIGS. 5 to 7, in this embodiment, a part of the first outer slided body 337 is received in the mounting space 336, and has a first outer slided slot 3371 extending in the left-right direction (D1). The first outer pivot end 338 is in the form of a pivot hole connected to and rotatable with the front shaft end 318 of the first axial shaft 312. The slided wall 339 is formed below the first outer slided slot 3371. In this embodiment, two pairs of the first auxiliary protrusions 341 are formed on the slided wall 339, and are arranged in the front-rear direction (D3). The first auxiliary protrusions 341 of each pair are spaced apart from each other in the left-right direction (D1). Similarly, a part of the second outer slided body 357 is received in the mounting space 356, and has a second outer slided slot 3571 extending in the left-right direction (D1). The second outer pivot end 358 is in the form of a pivot hole connected to and rotatable with the front shaft end 319 of the second axial shaft 313. The slided wall 359 is formed below the second outer slided slot 3571. In this embodiment, two pairs of the second auxiliary protrusions 361 are formed on the slided wall 359, and are arranged in the front-rear direction (D3). The second auxiliary protrusions 361 of each pair are spaced apart from each other in the left-right direction (D1).

Referring to FIGS. 3 and 7, the first slide piece 333 is connected with the first substrate unit 22, and has a first slide body 342 which extends in the left-right direction (D1) to have a proximate slide end 344 that is proximate to the mounting assembly 31 and that is slidable on the first outer slided body 337, and a distal connecting end 343 that is distal from the mounting assembly 31 and that is connected with the first inner connecting end 335. The first slide body 342 further extends in the front-rear direction (D3) to have a slide wall, and has at least one first auxiliary slide slot 3421 formed in the slide wall and elongated in the left-right direction (D1). The second slide piece 353 is connected with the second substrate unit 23, and has a second slide body 362 which extends in the left-right direction (D1) to have a proximate slide end 364 that is proximate to the mounting assembly 31 and that is slidable on the second outer slided body 357, and a distal connecting end 363 that is distal from the mounting assembly 31 and that is connected with the second inner connecting end 355. The second slide body 362 further extends in the front-rear direction (D3) to have a slide wall, and has at least one second auxiliary slide slot 3621 formed in the slide wall and elongated in the left-right direction (D1).

Referring to FIGS. 4, 5 and 7, in this embodiment, the slide wall of the first slide body 342 is superimposed upon and abuts against a lower surface of the slided wall 339, and has a front side edge 3422 coplanar with a front surface of the first outer slided body 337, a lateral side edge 3423 disposed below the first substrate seat 222 and coplanar with a back surface of the first substrate seat 222 facing away from the base seat 21, and two of the first auxiliary slide slots 3421. The first slide body 342 is secured to the lower surface of the first substrate seat 222. The first auxiliary protrusions 341 are respectively and slidably engaged in the first auxiliary slide slots 3421. The distal connecting end 343 is in the form of a pin and extends from the front side edge 3422 to be engaged in the first inner connecting end 335. The proximate slide end 344 is of U-shape, and has one end engaged in the first outer slided slot 3371, and the other end securely connected to the front side edge 3422. Thus, the proximate slide end 344 is slidable along the first outer slided slot 3371, and the first auxiliary protrusions 341 are respectively slidable along the first auxiliary slide slots 3421 so as to stabilize the sliding movement of the first slide body 342 relative to the first outer pivot arm 332.

Referring again to FIGS. 4, 5 and 7, in this embodiment, the slide wall of the second slide body 362 is superimposed upon and abuts against a lower surface of the slided wall 359, and has a front side edge 3622 coplanar with a front surface of the second outer slided body 357, a lateral side edge 3623 disposed below the second substrate seat 232 and coplanar with a back surface of the second substrate seat 232 facing away from the base seat 21, and two of the second auxiliary slide slots 3621. The second slide body 362 is secured to the lower surface of the second substrate seat 232. The second auxiliary protrusions 361 are respectively and slidably engaged in the second auxiliary slide slots 3621. The distal connecting end 363 is in the form of a pin and extends from the front side edge 3622 to be engaged in the second inner connecting end 355. The proximate slide end 364 is of U-shape, and has one end engaged in the second outer slided slot 3571, and the other end securely connected to the front side edge 3622. Thus, the proximate slide end 364 is slidable along the second outer slided slot 3571, and the second auxiliary protrusions 361 are respectively slidable along the second auxiliary slide slots 3621 so as to stabilize the sliding movement of the second slide body 362 relative to the second outer pivot arm 352.

Figure 10:
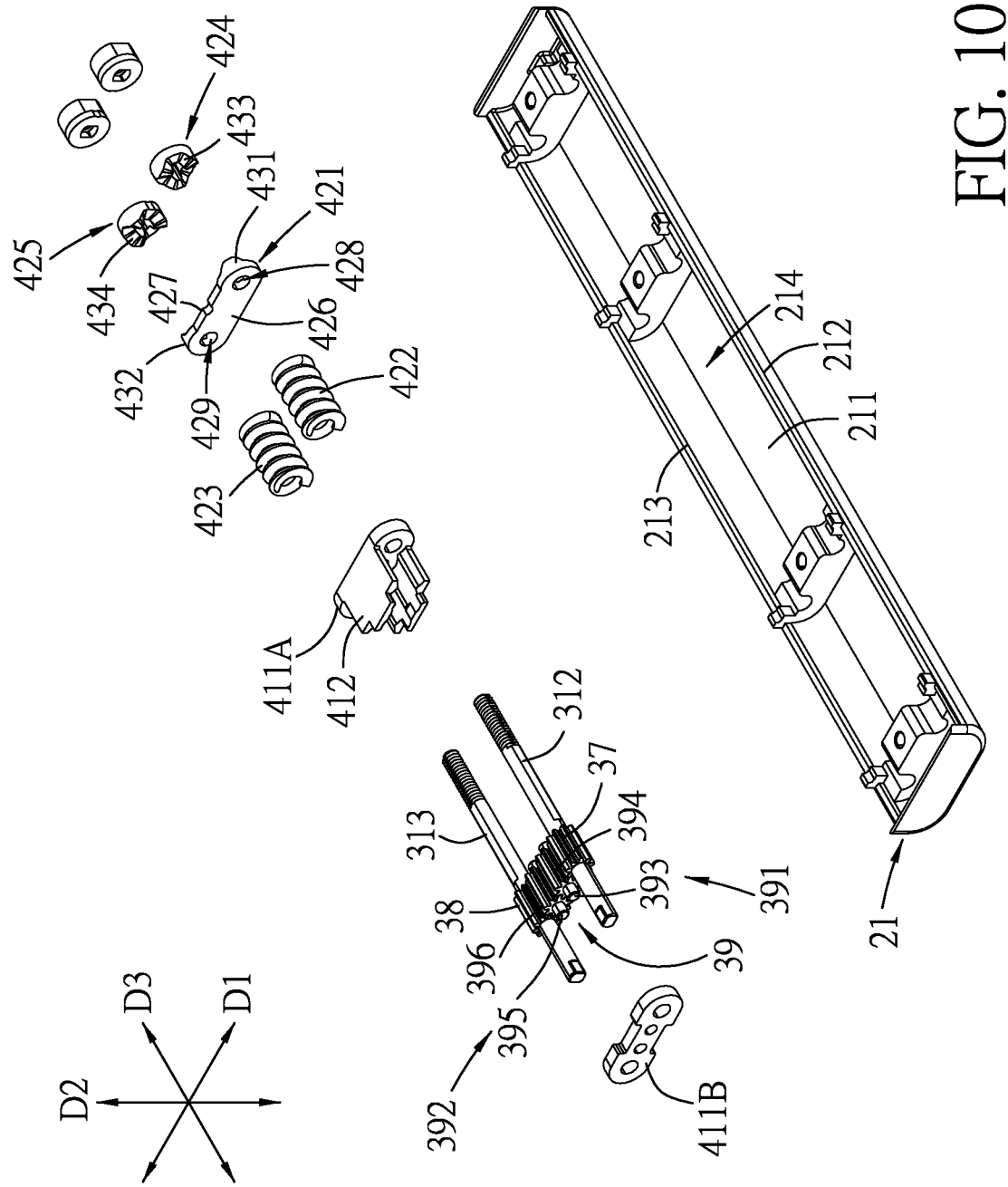
FIG. 10 is an exploded perspective view illustrating a first linking member, a second linking member, a synchronously driving unit and a friction increasing unit of the hinge mechanism.

Referring to FIGS. 6 and 10, the first linking member 37 is connected to and rotatable with the first axial shaft 312. The second linking member 38 is connected to and rotatable with the second axial shaft 313. The synchronously driving unit 39 is disposed between the first and second axial shafts 312, 313 and is coupled with the first and second linking members 37, 38 to transmit the turning of the first outer pivot arm 332 to the second outer pivot arm 352 so as to make synchronous pivoting of the first and second linking units 33, 35 in opposite rotational directions. In this embodiment, for example, each of the first and second linking members 37, 38 is a spur gear sleeved on the respective axial shaft 312, 313. The synchronously driving unit 39 includes first and second transmitting members 391, 392. The first transmitting member 391 has a first support shaft 393 and a first pinion 394 sleeved on the first support shaft 393 and meshing with the first linking member 37. The second transmitting member 392 has a second support shaft 395 and a second pinion 396 sleeved on the second support shaft 395 and meshing with the second linking member 38. The first and second pinions 394, 396 are spur gears, for example, and mesh with each other. Thus, pivoting of one of the first and second substrate units 22, 23 can result in pivoting of the other one of the first and second substrate units 22, 23. The first linking member 37, the first pinion 394, the second pinion 396 and the second linking member 38 may have the same number of teeth to ensure the same rotational angle of the first and second substrate units 22, 23, and may be varied in accordance with the dimension and design of the electronic device.

Referring again to FIGS. 6 and 10, the mounting plates 411A, 411B are disposed for passage of the first and second axial shafts 312, 313 to keep the first and second axial shafts 312, 313 and the first and second support shafts 393, 395 parallel to one another in the accommodation space 214, and are spaced apart from each other in the front-rear direction (D3) for the first and second linking members 37, 38 to be interposed therebetween. The first and second transmitting members 391, 392 are interposed between the mounting plates 411A, 411B. A cover plate 412 is disposed to cover portions of the first and second linking members 37, 38 and the synchronously driving unit 39 so as to prevent dust from entering.

Figure 11:
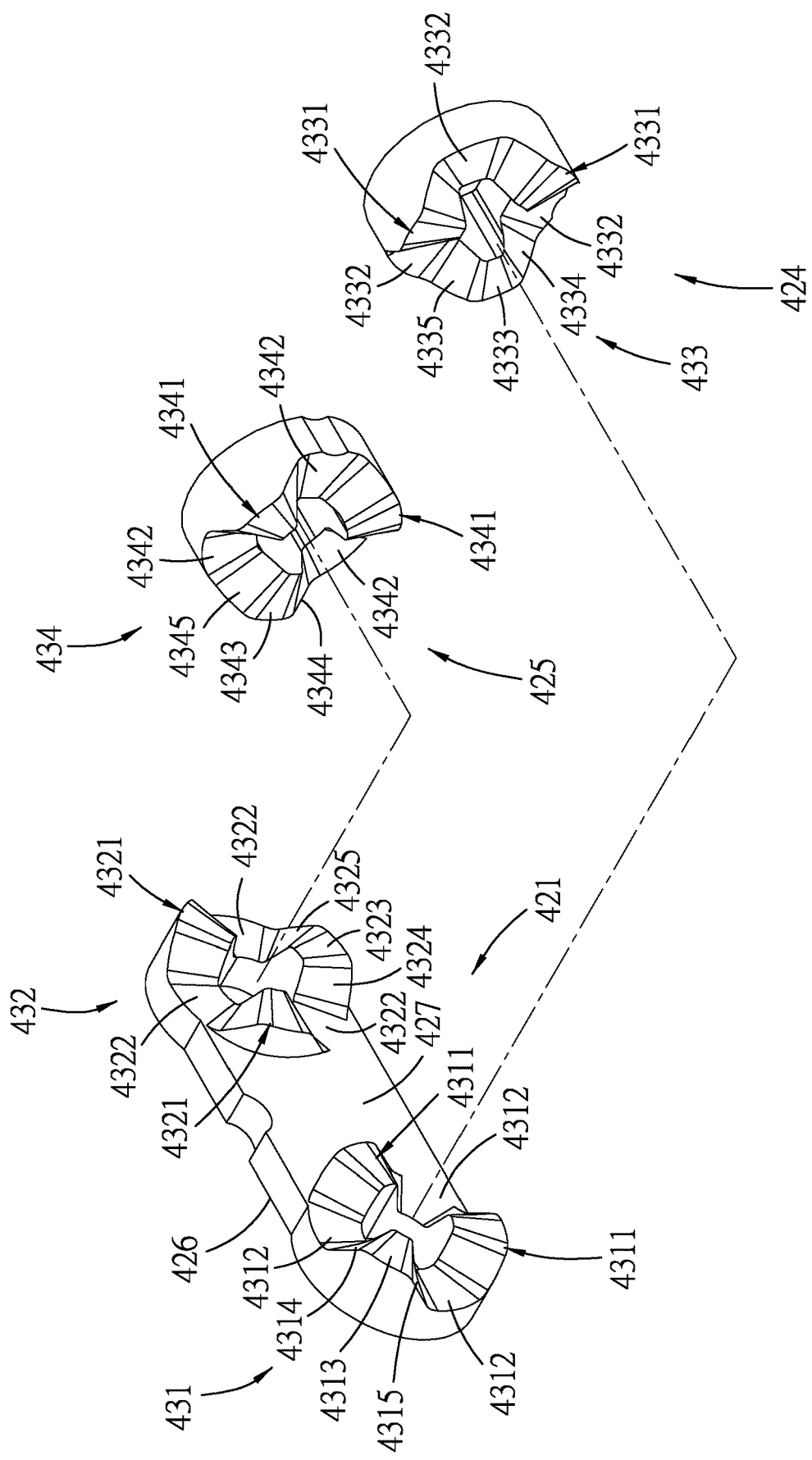
FIG. 11 is an exploded perspective view illustrating a crosspiece, a first frictional member and a second frictional member of the hinge mechanism.

Referring to FIGS. 6, 10 and 11, the friction increasing unit 42 interconnects the first and second axial shafts 312, 313 to provide a friction to angularly position the first and second linking units 33, 35. The friction increasing unit 42 includes a crosspiece 421, a first biasing member 422, a second biasing member 423, a first frictional member 424 and a second frictional member 425. In this embodiment, each of the first and second biasing members 422, 423 is a coil spring. Each of the first and second frictional members 424, 425 is in the form of a ring with an uneven surface.

The crosspiece 421 interconnects the first and second axial shafts 312, 313, and is spaced apart from the mounting plate 411A in the front-rear direction (D3). The crosspiece 421 has an abutting surface 426 and a frictional surface 427 respectively facing forward and rearward, and first and second penetrating holes 428, 429 extending therethrough in the front-rear direction (D3) for passage of the first and second axial shafts 312, 313, respectively. A first frictional feature 431 and a second frictional feature 432 are formed on the frictional surface 427 and around the first and second penetrating holes 428, 429, respectively. Each of the first and second frictional features 431, 432 has three frictional convex portions 4311, 4321 and three frictional concave portions 4312, 4322 angularly displaced from each other about the respective penetrating hole 428, 429. Each frictional convex portion 4311, 4321 has a flat frictional area 4313, 4323 and two lateral inclined surfaces 4314, 4315, 4324, 4325 inclined and extending from two sides of the flat frictional area 4313, 4323 to the adjacent frictional concave portion 4312, 4322.

Referring again to FIG. 10, the first biasing member 422 is sleeved around the first axial shaft 312 and abuts against the mounting plate 411A and the abutting surface 426. The second biasing member 423 is sleeved around the second axial shaft 313 and abuts against the mounting plate 411A and the abutting surface 426.

Referring to FIGS. 10 and 11, the first frictional member 424 is sleeved on and rotatable with the first axial shaft 312 and has a first interference surface 433 that faces and interferes with the first frictional feature 431. The second frictional member 425 is sleeved on and rotatable with the second axial shaft 313 and has a second interference surface 434 that faces and interferes with the second frictional feature 432. Specifically, each of the first and second interference surfaces 433, 434 has three frictional convex portions 4331, 4341 and three frictional concave portions 4332, 4342 angularly displaced from each other about the respective axis. Each frictional convex portion 4331, 4341 has a flat frictional area 4333, 4343 and two lateral inclined surfaces 4334, 4335, 4344, 4345 inclined and extending from two sides of the flat frictional area 4333, 4343 to the adjacent frictional concave portion 4332, 4342.

Figure 12:
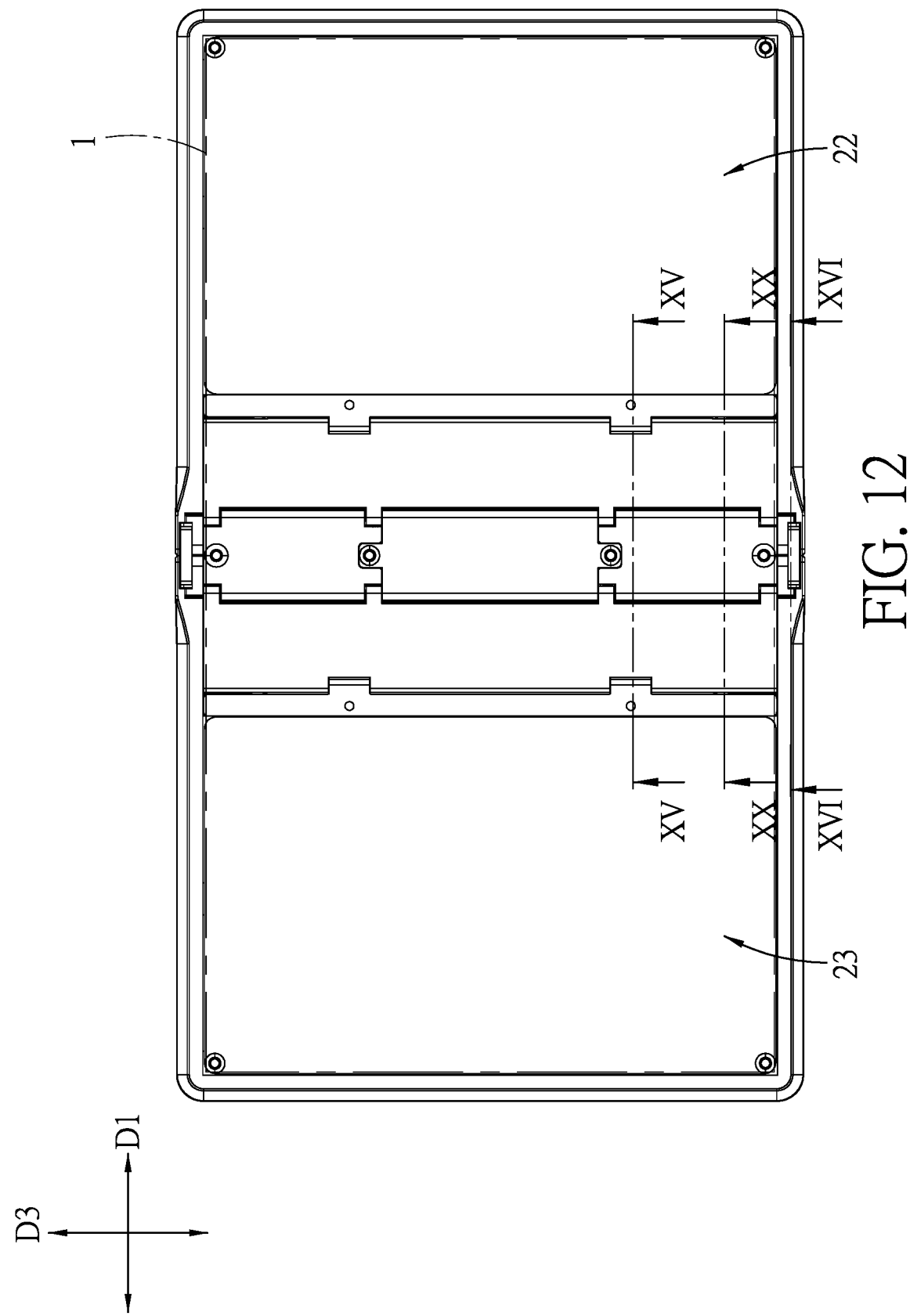
FIGS. 12 to 14 are schematic top view of the embodiment.
Figure 13:
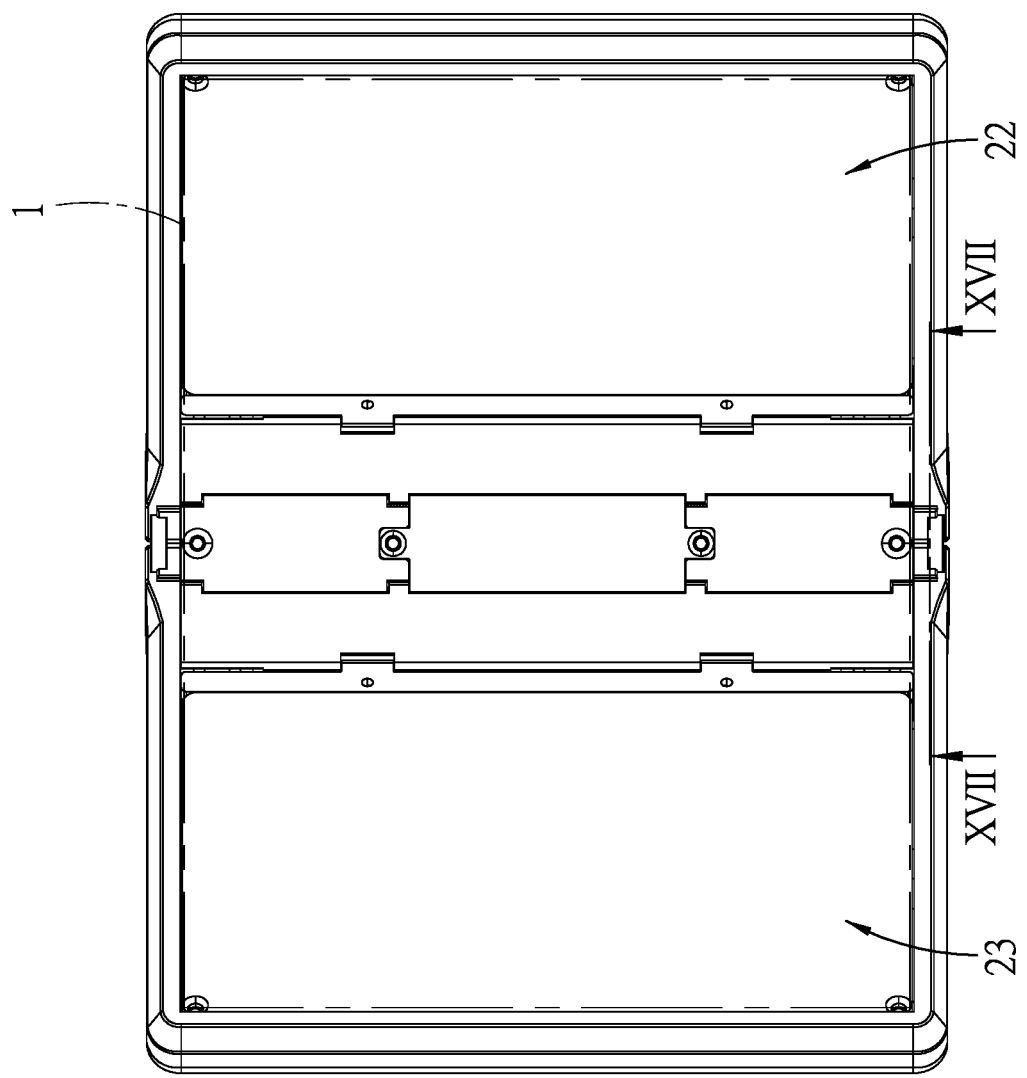
Figure 13:
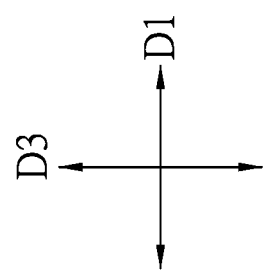
Figure 14:
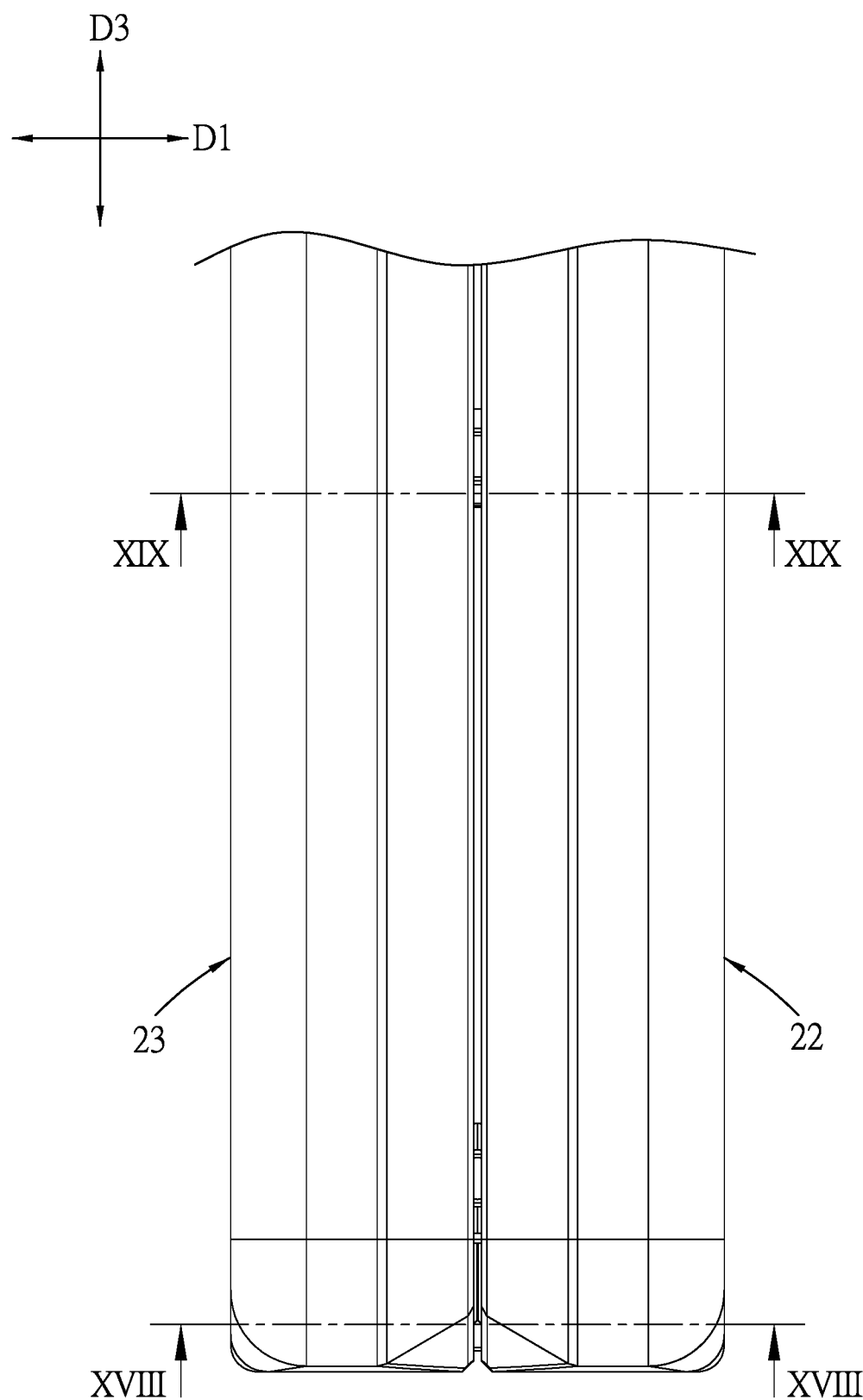
Figure 15:
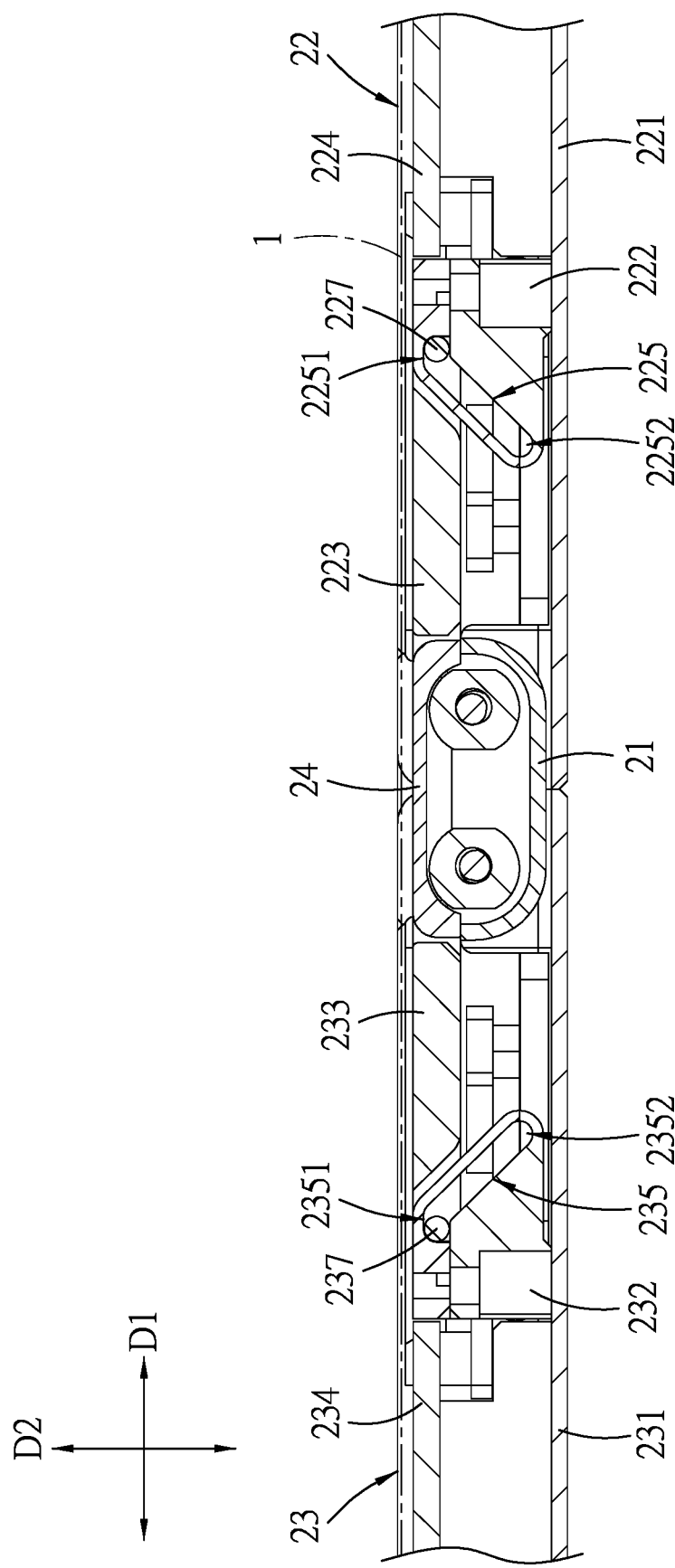
FIG. 15 is a sectional view taken along line XV-XV of FIG. 12.
Figure 16:
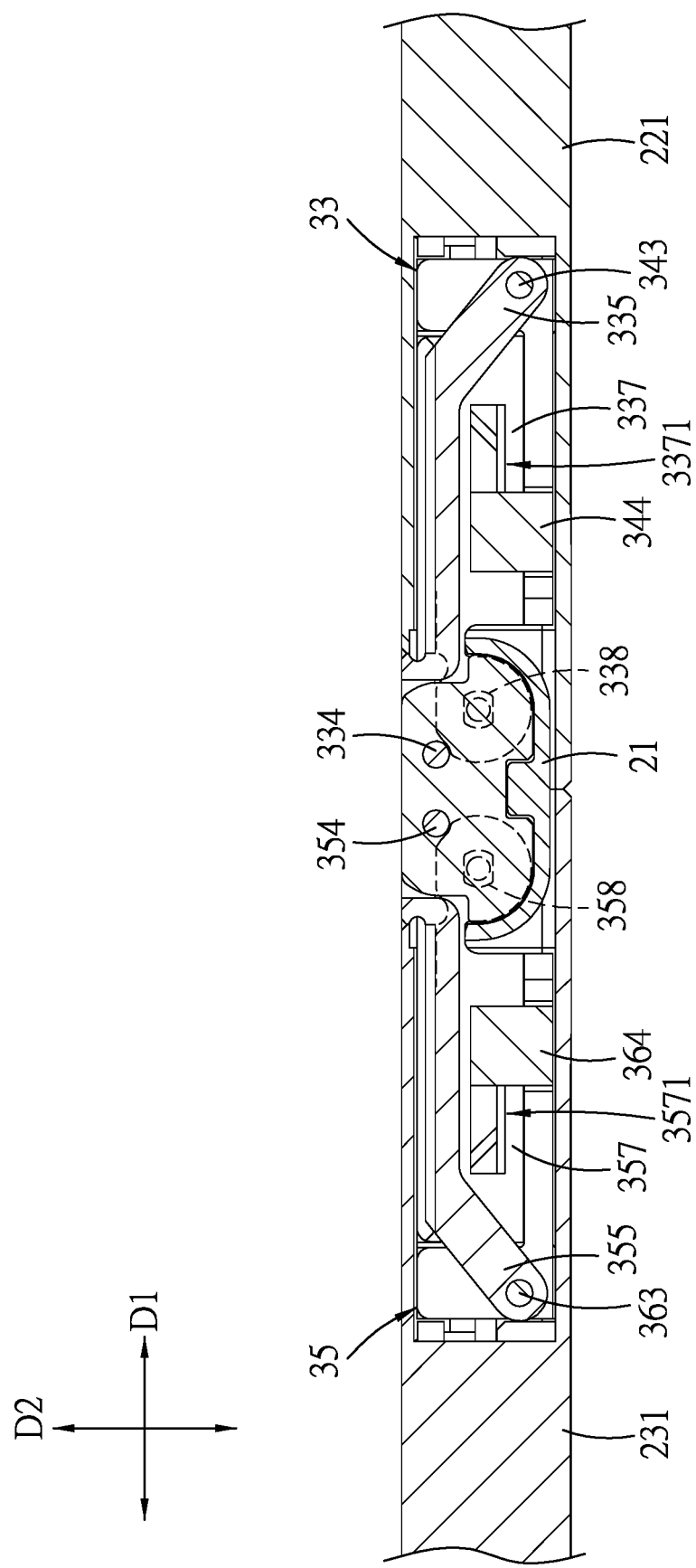
FIG. 16 is a sectional view taken along line XVI-XVI of FIG. 12.

Referring to FIGS. 12 to 14, which respectively illustrate, from a top the flexible electronic device, the parallel unfolded state, the state during the folding, and the upright folded state. FIGS. 15 and 16 illustrate the flexible electronic device in the parallel unfolded state.

Figure 17:
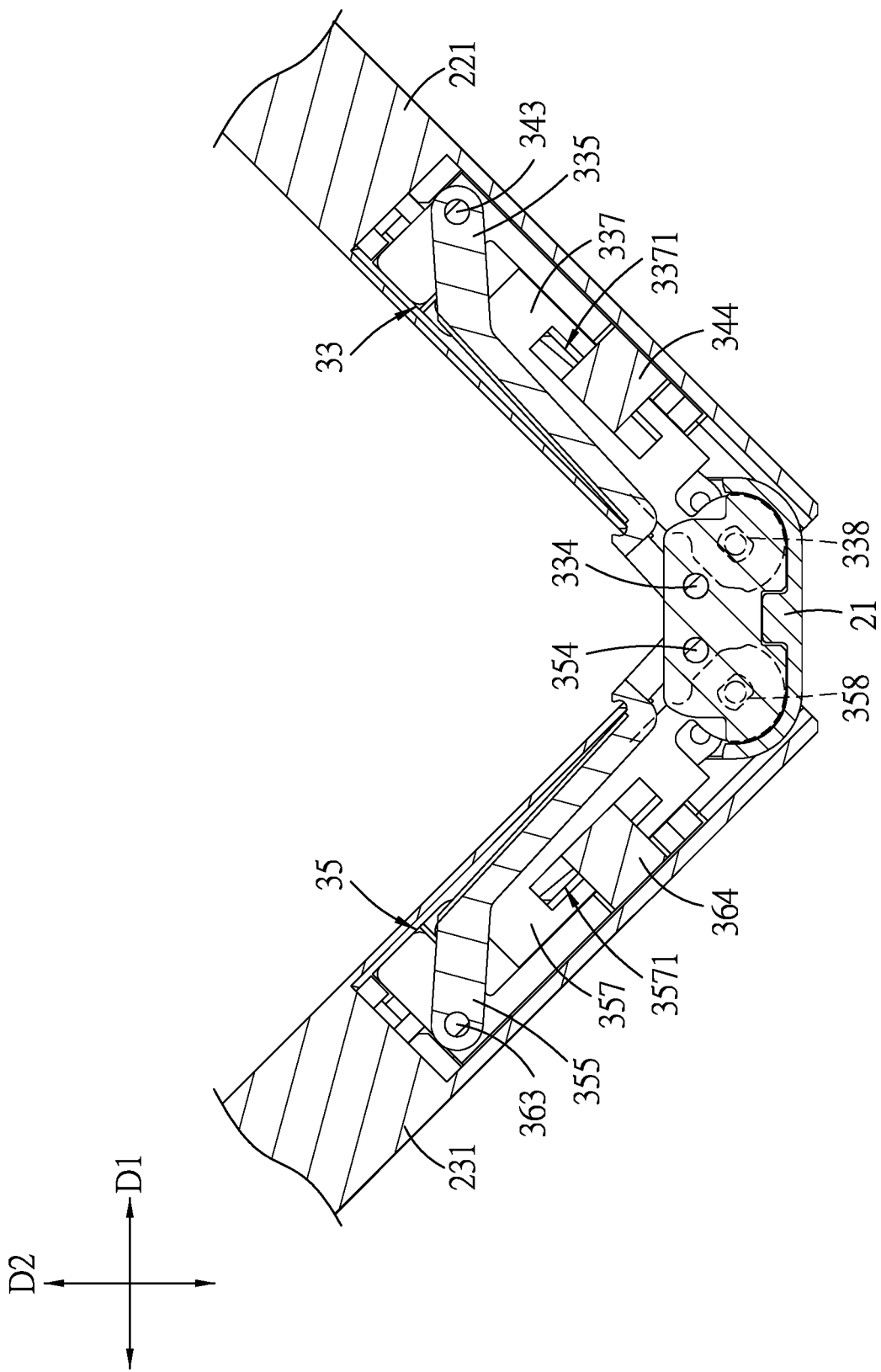
FIG. 17 is a sectional view taken along line XVII-XVII of FIG. 13.
Figure 18:
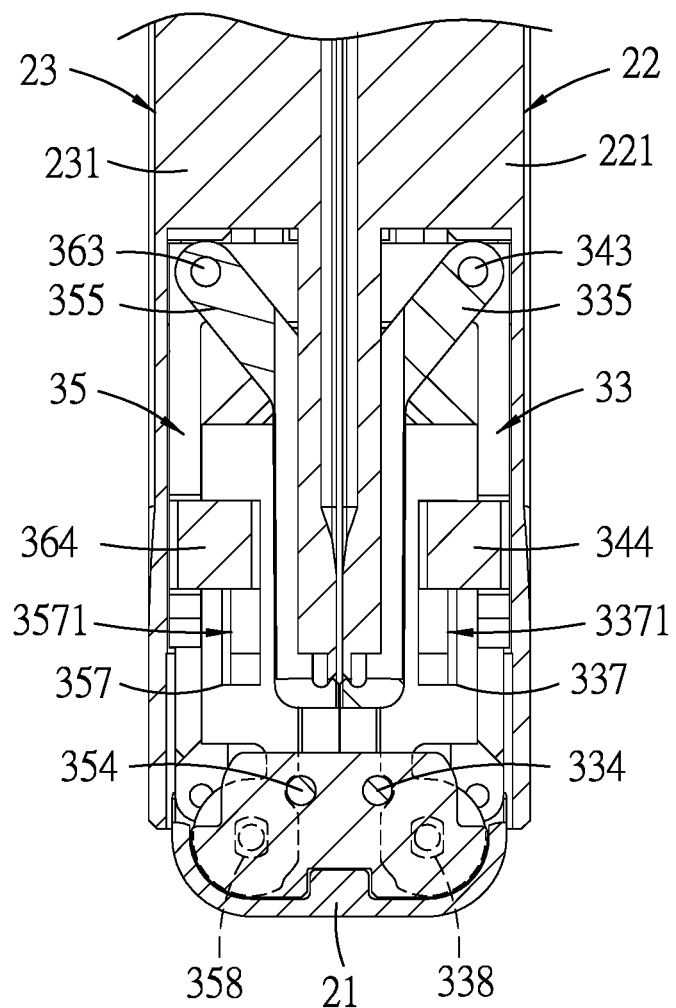
FIG. 18 is a sectional view taken along line XVIII-XVIII of FIG. 14.
Figure 19:
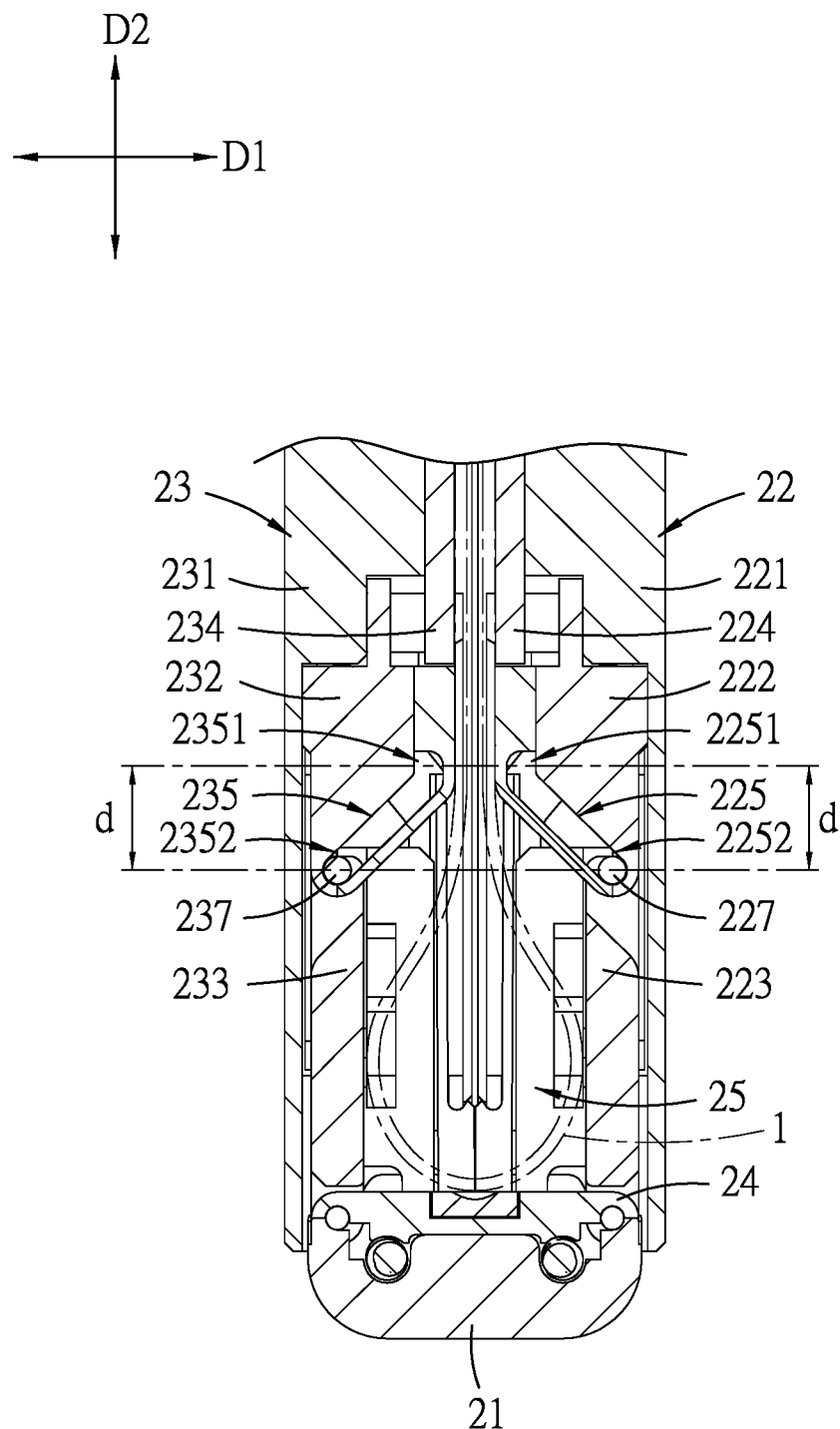
FIG. 19 is a sectional view taken along line XIX-XIX of FIG. 14.

For example, when the first housing 221 is operated by a user to move (rotate) upwardly toward the second housing 231, the first linking unit 33 is pivoted toward the second linking unit 35 with the first substrate seat 222. During the pivoting of the first linking unit 33, referring to FIGS. 16 to 18, with the first height (H1), turning of the first inner connecting end 335 brings the distal connecting end 343 of the first slide body 342 into an outward movement away from the first outer slided body 337. That is, the proximate slide end 344 is slided from an end of the first outer slided slot 3371 near the base seat 21 to the other end of the first outer slided slot 3371 near the first substrate seat 222 (see FIG. 17), and the first substrate seat 222 is also slided away from the first inner support plate 223 to be spaced apart by a distance (d), as shown in FIG. 19. That is, each of the connecting pins 227 is moved from the upper unfolded end 2251 of the corresponding first connecting slot 225 to the lower folded end 2252. At this stage, the first inner support plate 223 is moved closer to the lower wall of the first housing 221. The distance (d) can be varied in accordance with the dimension of the flexible display 1.

Figure 20:
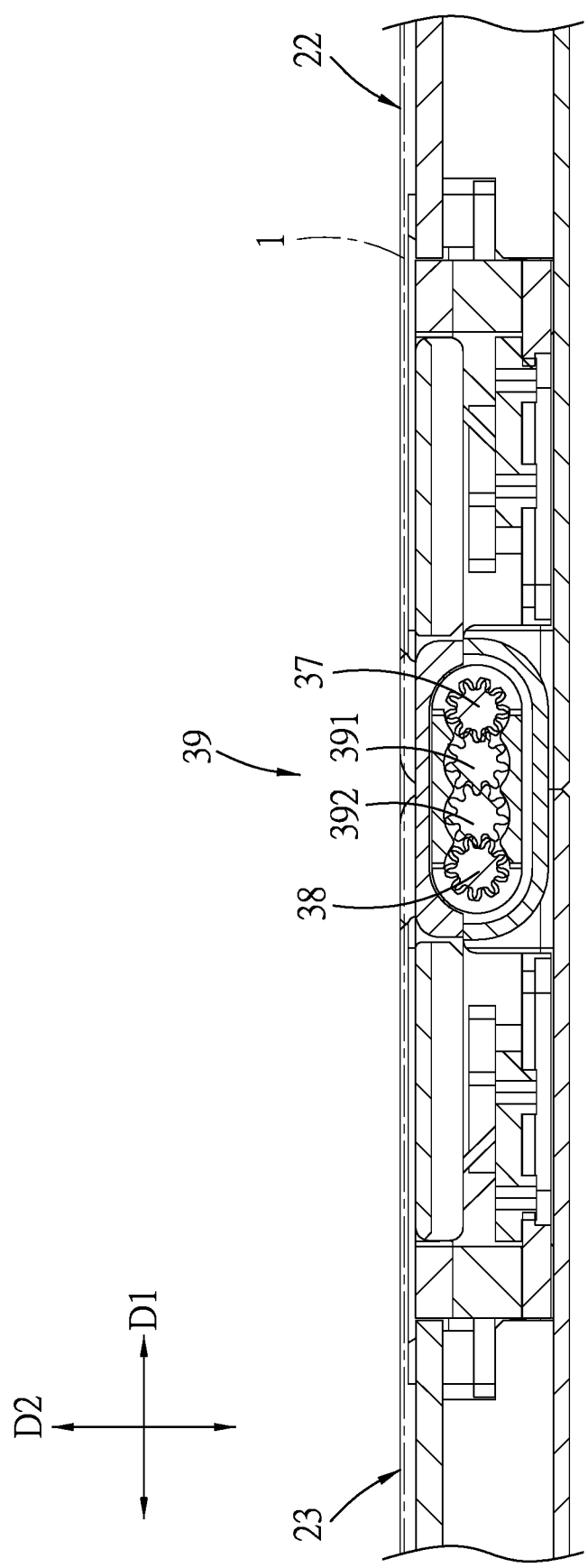
FIG. 20 is a sectional view taken along line XX-XX of FIG. 12.

Referring to FIG. 20, with the first and second linking members 37, 38 and the synchronously driving unit 39, when the first substrate unit 22 is rotated upwardly, the first linking unit 33 is pivoted to make synchronous pivoting of the first and second linking units 33, 35 in opposite rotational directions so as to rotate the second substrate unit 23 upwardly.

Similarly, when the second housing 231 is operated to rotate upwardly, the second linking unit 35 is pivoted toward the first linking unit 33 with the second substrate seat 232. During the pivoting of the second linking unit 35, referring to FIGS. 16 to 18, with the second height (H2), turning of the second inner connecting end 355 brings the distal connecting end 363 of the second slide body 362 into an outward movement away from the second outer slided body 357. That is, the proximate slide end 364 is slided from an end of the second outer slided slot 3571 near the base seat 21 to the other end of the second outer slided slot 3571 near the second substrate seat 232, and the second substrate seat 232 is also slided away from the second inner support plate 233 to be spaced apart by a distance (d), as shown in FIG. 19. That is, each of the connecting pins 237 is moved from the upper unfolded end 2351 of the corresponding second connecting slot 235 to the lower folded end 2352. At this stage, the second inner support plate 233 is moved closer to the lower wall of the second housing 231. Thus, the first substrate unit 22 and the second substrate unit 23 are shifted from the parallel unfolded state to the upright folded state, and a leeway space 25 is formed between the first and second substrate units 22, 23, as shown in FIG. 19.

Figure 21:
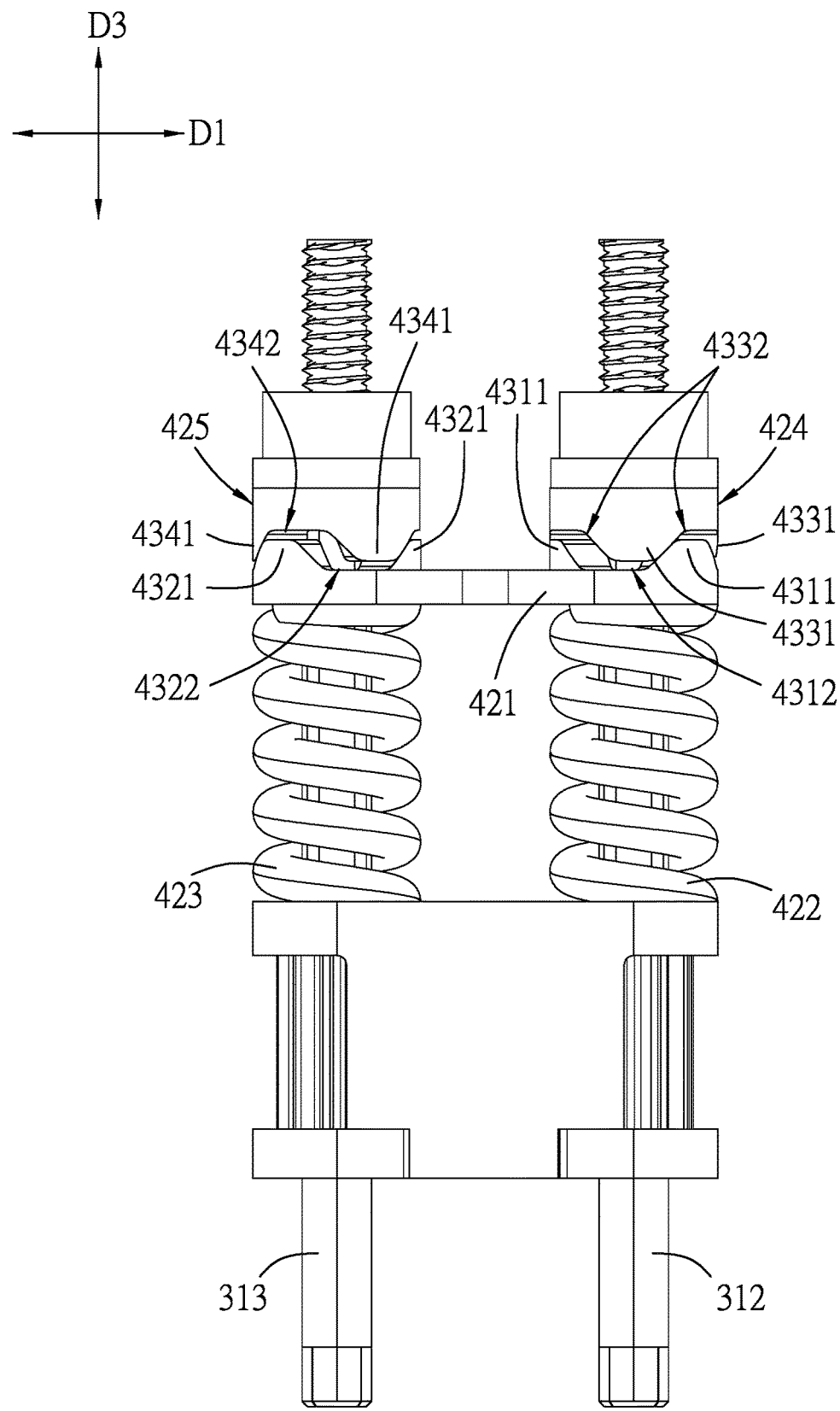
FIG. 21 is atop view illustrating the crosspiece, the first frictional member and the second frictional member in one of the unfolded and folded state.
Figure 22:
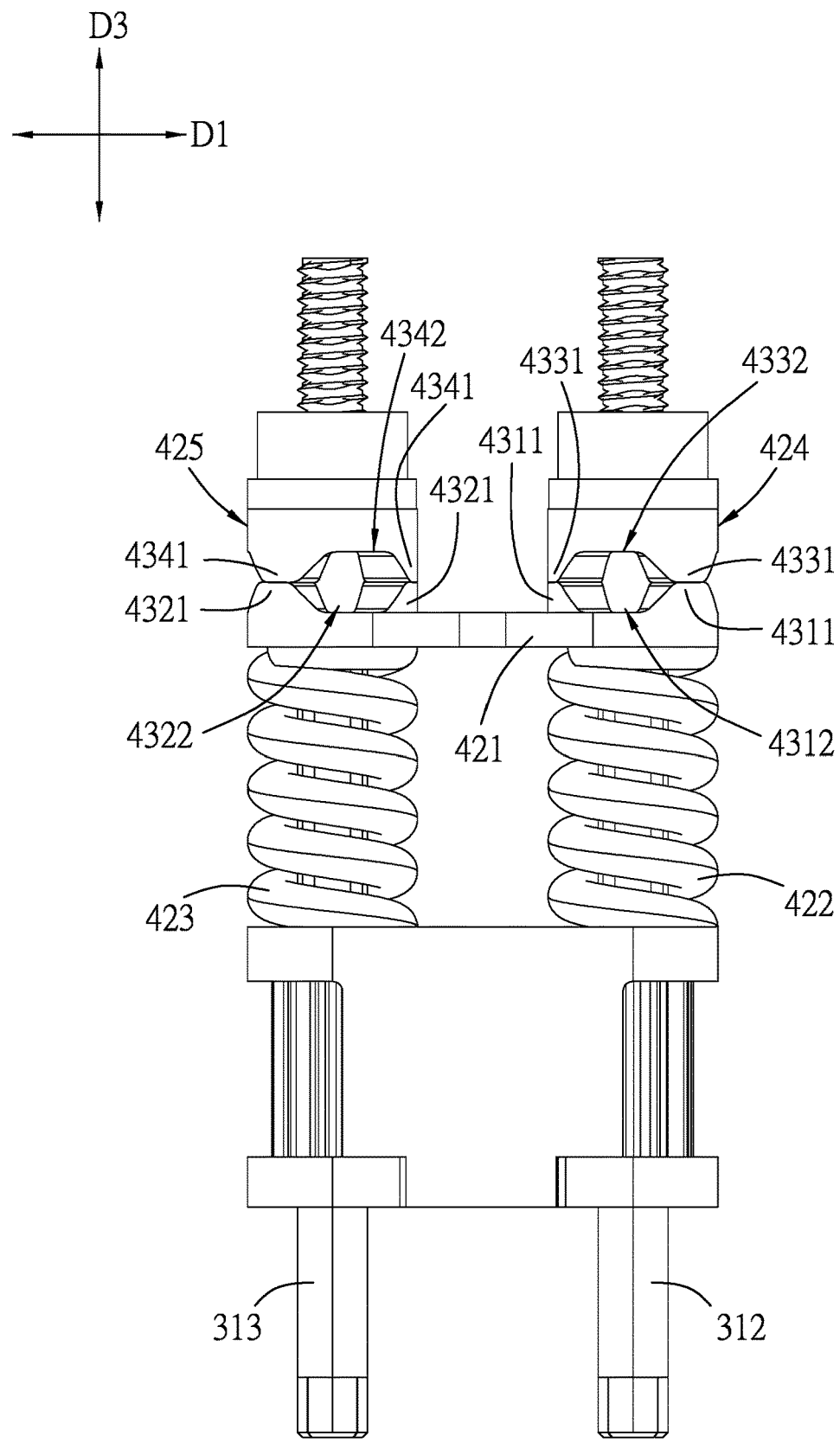
FIG. 22 is a top view illustrating the crosspiece, the first frictional member and the second frictional member in a state during a pivoting movement.

Moreover, referring to FIGS. 11, 21 and 22, in the parallel unfolded state, the frictional convex portions 4331, 4341 of the first and second frictional members 424, 425 are engaged with the frictional concave portions 4312, 4322 of the crosspiece 421. During the pivoting of the first or second linking unit 33, 35, the first (second) axial shaft 312 is rotated with the first (second) outer pivot arm 332 (see FIG. 7) to rotate the first (second) frictional member 424. For example, the lateral inclined surface 4334 of each frictional convex portion 4331 first abuts against the lateral inclined surface 4315 of the frictional convex portion 4311, and subsequently, the flat frictional area 4333 of the frictional convex portion 4331 is shifted to abut against the flat frictional area 4313 of the frictional convex portion 4311. When the first (second) frictional member 424 is further rotated, the lateral inclined surface 4335 is brought in abutment against the lateral inclined surface 4314 of the frictional convex portion 4311, and then the frictional concave portion 4332 is engaged with the frictional convex portion 4311 in the folded state. With the lateral inclined surfaces, the flat frictional area of the frictional convex portion is easily movable to engage with the frictional concave portion, and, during the pivoting of the first or second substrate unit 22, 23, the flexible electronic device can be positioned more firmly to the unfolded state or the folded state.

As illustrated, with the first height (H1) between the first outer and inner pivot axes and the second height (H2) between the second outer and inner pivot axes, the first and second substrate seats 222, 232 can be moved away from the first and second inner support plates 223, 233, and the first and second inner support plates 223, 233 are movable downwardly relative thereto to provide a leeway space 25 for a bending part of the flexible display 1 to be bendably received therein.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A hinge mechanism mountable on a support mechanism for carrying a flexible display, the support mechanism including a base seat, and first and second substrate units which are respectively disposed at two sides of the base seat opposite in a left-right direction, said hinge mechanism comprising:

a mounting assembly securely mountable on the base seat, said mounting assembly having first and second pivoted portions opposite to each other in the left-right direction and respectively adjacent to the first and second substrate units;

a first linking unit disposed at and pivotable relative to said first pivoted portion, and including a first inner pivot arm having a first inner pivot end which is pivotably connected to said first pivoted portion about a first inner pivot axis, and a first inner connecting end which is opposite to said first inner pivot end to be turned about the first inner pivot axis during pivoting of said first linking unit, a first outer pivot arm having a first outer slided body which extends in the left-right direction to terminate at a first outer pivot end that is disposed outboard of said first inner pivot end, said first outer pivot end being pivotably connected to said first pivoted portion about a first outer pivot axis which is offset from the first inner pivot axis in an up-down direction with a first height such that said first outer slided body is turned about the first outer pivot axis during the pivoting of said first linking unit, and a first slide piece connected with the first substrate unit, and having a first slide body which extends in the left-right direction to have a proximate slide end that is proximate to said mounting assembly and that is slidable on said first outer slided body, and a distal connecting end that is distal from said mounting assembly and that is connected with said first inner connecting end; and a second linking unit disposed at and pivotable relative to said second pivoted portion, and including a second inner pivot arm having a second inner pivot end which is pivotably connected to said second pivoted portion about a second inner pivot axis, and a second inner connecting end which is opposite to said second inner pivot end to be turned about the second inner pivot axis during pivoting of said second linking unit, a second outer pivot arm having a second outer slided body which extends in the left-right direction to terminate at a second outer pivot end that is disposed outboard of said second inner pivot end, said second outer pivot end being pivotably connected to said second pivoted portion about a second outer pivot axis which is offset from the second inner pivot axis in the up-down direction with a second height such that said second outer slided body is turned about the second outer pivot axis during the pivoting of said second linking unit, and a second slide piece connected with the second substrate unit, and having a second slide body which extends in the left-right direction to have a proximate slide end that is proximate to said mounting assembly and that is slidable on said second outer slided body, and a distal connecting end that is distal from said mounting assembly and that is connected with said second inner connecting end, wherein during the pivoting of said first linking unit, turning of said first inner connecting end brings said distal connecting end of said first slide body into an outward movement away from said first outer slided body, and during the pivoting of said second linking unit, turning of said second inner connecting end brings said distal connecting end of said second slide body into an outward movement away from said second outer slided body so as to place the first substrate unit and the second substrate unit from a parallel unfolded state to an upright folded state, and form a leeway space between the first and second substrate units.

2. The hinge mechanism as claimed in claim 1, wherein said mounting assembly includes a fixed piece which is securely mounted on the base seat and which has said first and second pivoted portions respectively having first and second pivot holes for respectively engaging with said first and second inner pivot ends and defining the first and second inner pivot axes, respectively, a first axial shaft which extends in a front-rear direction and which has a front shaft end disposed outwardly and downwardly of said first pivot hole to define the first outer pivot axis for said first outer pivot end to be connected thereto, and a second axial shaft which extends in the front-rear direction and which has a front shaft end disposed outwardly and downwardly of said second pivot hole to define the second outer pivot axis for said second outer pivot end to be connected thereto.

3. The hinge mechanism as claimed in claim 1, wherein said first slide body of said first slide piece further extends in a front-rear direction to have a slide wall, and has at least one first auxiliary slide slot formed in said slide wall and elongated in the left-right direction, said first outer pivot arm further extending in the front-rear direction to have a slided wall which is disposed to abut against said slid wall of said first slide body, and having at least one first auxiliary protrusion which projects from said slided wall and which is slidably engaged in said first auxiliary slide slot such that, during the pivoting of said first linking unit, said slide wall of said first slide body is slided on said slided wall along an elongated direction of said first auxiliary slide slot so as to bring the outward movement of said distal connecting end away from said first outer slide body, and wherein said second slide body of said second slide piece further extends in the front-rear direction to have a slide wall, and has at least one second auxiliary slide slot formed in said slide wall and elongated in the left-right direction, said second outer pivot arm further extending in the front-rear direction to have a slided wall which is disposed to abut against said slide wall of said second slide body, and having at least one second auxiliary protrusion which projects from said slided wall and which is slidably engaged in said second auxiliary slide slot such that, during the pivoting of said second linking unit, said slide wall of said second slide body is slided on said slided wall along an elongated direction of said second auxiliary slide slot so as to bring the outward movement of said distal connecting end away from said second outer slide body.

4. The hinge mechanism as claimed in claim 2, further comprising a first linking member connected to and rotatable with said first axial shaft, a second linking member connected to and rotatable with said second axial shaft, and a synchronously driving unit disposed between said first and second axial shafts and coupled with said first and second linking members to transmit the turning of said first outer pivot arm to said second outer pivot arm so as to make synchronous pivoting of said first and second linking units in opposite rotational directions.

5. The hinge mechanism as claimed in claim 4, further comprising two mounting plates disposed for passage of said first and second axial shafts to keep said first and second axial shafts parallel to each other, and spaced apart from each other in the front-rear direction for said first and second linking members to be interposed therebetween, said synchronously driving unit including first and second transmitting members which are interposed between said mounting plates and respectively engaged with said first and second linking members, said first and second transmitting members being engaged with each other to make the synchronous pivoting of said first and second linking units.

6. The hinge mechanism as claimed in claim 5, further comprising a friction increasing unit interconnecting said first and second axial shafts to provide a friction to angularly position said first and second linking units.

7. The hinge mechanism as claimed in claim 6, wherein said friction increasing unit includes a crosspiece which interconnects said first and second axial shafts, which is spaced apart from said mounting plates in the front-rear direction, and which has an abutting surface and a frictional surface respectively facing forward and rearward, a first biasing member which is sleeved around said first axial shaft and abuts against one of said mounting plates and said abutting surface, a second biasing member which is sleeved around said second axial shaft and abuts against said one mounting plates and said abutting surface, a first frictional member which is disposed on and rotatable with said first axial shaft and has a first interference surface that faces and interferes with said frictional surface, and a second frictional member which is disposed on and rotatable with said second axial shaft and has a second interference surface that faces and interferes with said frictional surface.

8. A flexible electronic device comprising:
a flexible display;
a support mechanism for carrying said flexible display thereon, and including
a base seat, and
first and second substrate units which are respectively disposed at two sides of said base seat opposite in a left-right direction; and
two hinge mechanisms as claimed in claim 1, each of said hinge mechanisms being disposed between said first and second substrate units and interconnecting inboard end edges of said first and second substrate units.

9. The flexible electronic device as claimed in claim 8, wherein said first substrate unit has a first housing, and a first substrate seat and a first inner support plate which are disposed upon said first housing and coplanar with each other, said first substrate seat being connected with said first slide piece of each of said hinge mechanisms, and having at least one first connecting slot which is formed in a proximal side relative to said base seat, extends from an upper end of said first substrate seat toward a lower wall of said first housing, and is inclined toward said base seat, said first inner support plate being interposed between said base seat and said first substrate seat and having at least one notch formed in an adjoined side relative to said first substrate seat, and at least one connecting pin formed in said notch and movably engaged with said first connecting slot such that, during the pivoting of said first linking unit, the outward movement of said first slide body and said first substrate seat away from said first outer slided body brings said first inner support plate into movement relative to said first substrate seat toward said lower wall of said first housing, and wherein said second substrate unit has a second housing, and a second substrate seat and a second inner support plate which are disposed upon said second housing and coplanar with each other, said second substrate seat being connected with said second slide piece of each of said hinge mechanisms, and having at least one second connecting slot which is formed in a proximal side relative to said base seat, extends from an upper end of said second substrate seat toward a lower wall of said second housing, and is inclined toward said base seat, said second inner support plate being interposed between said base seat and said second substrate seat and having at least one notch formed in an adjoined side relative to said second substrate seat, and at least one connecting pin formed in said notch and movably engaged with said second connecting slot such that, during the pivoting of said second linking unit, the outward movement of said second slide body and said second substrate seat away from said second outer slided body brings said second inner support plate into movement relative to said second substrate seat toward said lower wall of said second housing so as to place said first and second inner support plates from the parallel unfolded state to the upright folded state and form the leeway space between said first and second inner support plates.

\* \* \* \* \*